(12) United States Patent
Tenma et al.

(10) Patent No.: US 7,328,874 B2
(45) Date of Patent: Feb. 12, 2008

(54) SUPPORTING DEVICE FOR NON-AVERAGED FORCE

(75) Inventors: Katsutoshi Tenma, Tokyo (JP); Masashi Igarashi, Tokyo (JP); Kenji Otsuka, Osaka (JP); Kikuo Saito, Osaka (JP); Haruhiko Shimizu, Osaka (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 0 days.

(21) Appl. No.: 11/417,922

(22) Filed: May 3, 2006

(65) Prior Publication Data

US 2006/0284028 A1 Dec. 21, 2006

Related U.S. Application Data

(63) Continuation of application No. 10/079,077, filed on Feb. 19, 2002, now abandoned.

(30) Foreign Application Priority Data

| Feb. 20, 2001 | (JP) | ................ 2001-42868 |
| Sep. 28, 2001 | (JP) | ............... 2001-301225 |
| Sep. 28, 2001 | (JP) | ............... 2001-301292 |

(51) Int. Cl.
*F16L 3/00* (2006.01)
(52) U.S. Cl. ............ 248/74.4; 248/29; 248/65
(58) Field of Classification Search ............ 248/65, 248/74.1, 74.4, 49
See application file for complete search history.

(56) References Cited

U.S. PATENT DOCUMENTS

| 2,800,867 A | 7/1957 | Smith |
| 3,433,504 A | 3/1969 | Hanes |
| 3,550,638 A | 12/1970 | Smith |
| 3,705,453 A | 12/1972 | Olson |
| 3,898,714 A | 8/1975 | McFadden |
| 3,966,528 A | 6/1976 | Christie |
| 4,092,036 A | 5/1978 | Sato et al. |
| 4,182,504 A | 1/1980 | Bernhard |
| 4,356,615 A | 11/1982 | Dearman |
| 4,492,015 A | 1/1985 | Dearman |
| 4,848,808 A | 7/1989 | Pannell et al. |
| 4,858,861 A * | 8/1989 | Wilkinson, III ............ 248/74.1 |
| 5,165,160 A | 11/1992 | Poncelet |
| 5,560,162 A * | 10/1996 | Kemeny ................ 52/167.3 |
| 5,772,252 A | 6/1998 | Malani |
| 5,947,527 A | 9/1999 | Carter |
| 6,533,331 B2 | 3/2003 | Hulsebos et al. |
| D490,690 S * | 6/2004 | Brass et al. ............. D8/354 |

FOREIGN PATENT DOCUMENTS

DE 17 71 057 U 8/1958

(Continued)

*Primary Examiner*—Carl D. Friedman
*Assistant Examiner*—Steven Marsh
(74) *Attorney, Agent, or Firm*—Knobbe Martens Olson & Bear, LLP

(57) ABSTRACT

A supporting device for non-averaged force in a pipeline comprised of a frame that is fixed to a supporting portion and a fixing mechanism for fixing a pipe body to the frame, wherein wedge bodies capable of blocking movements of the pipe body in a pipe axial direction with respect to the frame are provided when being pressed against an outer surface of the pipe body through pressing force acting from the frame towards the pipe body.

11 Claims, 22 Drawing Sheets

FOREIGN PATENT DOCUMENTS

| | | |
|---|---|---|
| DE | 88 13 723 U | 12/1988 |
| DE | EP 0 787 939 A1 | 8/1997 |
| FR | 2 773 386 A1 | 7/1999 |
| JP | 49-134324 | 3/1974 |
| JP | 44-57787 | 4/1980 |
| JP | 7-280147 | 10/1995 |
| JP | 11-218276 | 8/1999 |
| JP | 2000-18430 | 1/2000 |
| JP | 2001-349470 | 12/2001 |

* cited by examiner (a)

(b)

SUPPORTING DEVICE FOR NON-AVERAGED FORCE

CROSS-REFERENCE TO RELATED APPLICATIONS

This is a continuation of U.S. patent application Ser. No. 10/079,077, filed Feb. 19, 2002 now abandoned, which claims priority to Japanese Patent Application No. 2001-4268, filed Feb. 20, 2001, No. 2001-301225, field Sep. 28, 2001, and No. 2001-301292, field Sep. 28, 2001, and the disclosure of which is herein incorporated by reference in its entirety.

BACKGROUND OF THE INVENTION

1. Field of the Invention

The present invention relates to a supporting device for non-averaged force in a pipeline.

2. Description of the Related Art

It is generally the case with a bent pipeline 2 as exemplarily illustrated in FIG. 47 that non-averaged force acts onto to joint portions 4 of a plurality of pipe bodies 3 comprising the pipeline 2 which is caused through hydrostatic pressure within the pipes. Since force acts onto joint portions of the pipeline in an axial core direction of the pipe bodies 3 (hereinafter referred to as "pipe axial direction") owing to the non-averaged force, a supporting structure for supporting the pipeline 2 will be necessary.

For supporting the above pipeline 2, it was conventionally performed that the pipe bodes 3 within a utility tunnel 1 was fixed by means of a body 5 made of reinforced concrete (wherein 6 denote reinforcements) as illustrated in FIG. 48. Such a supporting structure was disadvantaged in that construction of reinforced concrete was difficult to be performed within a small space such as the utility tunnel 1 and in that construction was troublesome.

A technique in which steel-made belts are wound and fixed around pipe bodies through bolts has been proposed as one technique for solving the above problem. However, since movements of the pipe bodies in pipe axial directions are prevented through frictional resistance between the belts and pipe bodies, it is difficult to firmly support non-averaged force in the pipeline.

SUMMARY OF THE INVENTION

The present invention has thus been made in view of the above problems present in the prior art, and it is an object thereof to support non-averaged force in a pipeline for achieving protection.

More particularly, the characteristic components of the supporting device for non-averaged force according to the present invention are:

a frame, which is fixed to a supporting portion, and
a fixing mechanism, which serves to fix pipe bodies to the frame,
wherein the fixing mechanism is arranged in that a wedge body is provided that is capable of blocking movements of the pipe body in a pipe axial direction with respect to the frame upon being pressed against an outer surface of the pipe body through pressing force acting from the frame towards the pipe body.

According to this arrangement, the pipe body and the frame may be integrated through the wedge bodies that are pressed against the outer surface of the pipe body. Moreover, movements of the pipe body in the pipe axial direction owing to non-averaged force may be blocked through the wedge actions of the wedge bodies. With this arrangement, it is possible to comprise a firm protection work.

It was accordingly possible to provide a supporting device for non-averaged force in a pipeline with which it is possible to support non-averaged force in a pipeline and to achieve protection.

Further characteristic components of the supporting device for non-averaged force according to the present invention are:

a frame, which is fixed to a supporting portion, and
a fixing mechanism, which serves to fix pipe bodies to the frame,
wherein the fixing mechanism is arranged in that the frame is provided with an edge portion for receiving an outer surface of the pipe body from one side in a radial direction of the pipe body by pinching the pipe body, and in that a wedge body is provided that is capable of blocking movements of the pipe body in a pipe axial direction with respect to the frame by being pressed against an outer surface of the pipe body from the other side in the radial direction of the pipe body through pressing force acting from the frame towards the pipe body.

According to this arrangement, the pipe body and the frame may be integrated through the edge portion and the wedge body that is pressed against the outer surface of the pipe body. Moreover, movements of the pipe body in the pipe axial direction owing to non-averaged force may be blocked through the wedge actions of the wedge body and the cutting-in actions of the edge portion with respect to the outer surface of the pipe body. With this arrangement, it is possible to comprise a firm protection work.

It was accordingly possible to provide a supporting device for non-averaged force in a pipeline with which it is possible to support non-averaged force in a pipeline and to achieve protection.

It is preferable to dispose a plurality of wedge bodies at specified intervals in the pipe axial direction and to set a posture of the respective wedge bodies such that directions of wedge actions of one pair of wedge bodies adjoining in the pipe axial direction are opposite to each other in the pipe axial direction.

According to this arrangement, either of the wedge bodies may act in case the pipe body tries to move in any one of the pipe axial directions whereby it is possible to block movements of the pipe body and to receive non-averaged force. It is accordingly possible to comprise a firm protection work and is thus comfortable.

Still further characteristic components of the supporting device for non-averaged force according to the present invention are:

a frame, which is fixed to a supporting portion, and
a fixing mechanism, which serves to fix a pipe body to the frame,
wherein the fixing mechanism is arranged in that male screw members are provided that are capable of blocking movements of the pipe body in a pipe axial direction by pressing an outer surface of the pipe body at their tip end portions in a condition in which they are screwed into female screw portions formed in the frame.

According to this arrangement, the pipe body and the frame may be integrated through the male screw members that are pressed against the outer surface of the pipe body. It is possible to block movements of the pipe body in the pipe axial direction owing to non-averaged force through pressing force of the male screw members. It is accordingly possible to comprise a firm protection work.

It was accordingly possible to provide a supporting device for non-averaged force in a pipeline with which it is possible to support non-averaged force in a pipeline and to achieve protection.

Still further characteristic components of the supporting device for non-averaged force according to the present invention are:

a frame, which is fixed to a supporting portion, and
a fixing mechanism, which serves to fix a pipe body to the frame,
wherein the fixing mechanism is arranged in that the frame is provided with edge portions for receiving an outer surface of pipe body from one side in a radial direction of the pipe body by pinching the pipe body, and in that male screw members are provided that are capable of blocking movements of the pipe body in a pipe axial direction with respect to the frame by pressing an outer surface of the pipe body with their tip end portions in a condition in which they are screwed into female screw portions formed in the frame.

According to this arrangement, the pipe body and the frame may be integrated through the edge portions and the male screw members that are pressed against the outer surface of the pipe body. Moreover, it is possible to block movements of the pipe body in the pipe axial direction owing to non-averaged force through the pressing actions of the male screw members and the cutting-in actions of the edges with respect to the outer surface of the pipe body. With this arrangement, it is possible to comprise a firm protection work.

It was accordingly possible to provide a supporting device for non-averaged force in a pipeline with which it is possible to support non-averaged force in a pipeline and to achieve protection.

It is preferable that the tip end portions of the male screw members are indented.

According to this arrangement of indenting the tip end portions of the male screw members, the tip end portions of the male screw members can easily cut into the outer surface of the pipe body and is thus comfortable.

Still further characteristic components of the supporting device for non-averaged force according to the present invention are:

a frame, which is fixed to a supporting portion, and
a fixing mechanism, which serves to fix a pipe body to the frame,
wherein the fixing mechanism is arranged in that a movement blocking body is provided that is capable of blocking movements of the pipe bodies in a pipe axial direction by being pressed against an outer surface of the pipe body through pressing force acting from the frame towards the pipe body,
the movement blocking body being comprised with a pair of edge portions that are pressed against the outer surface of the pipe body and that are provided in a condition in which they are located at a specified interval in the pipe axial direction.

According to this arrangement, the pipe body and the frame may be integrated through the movement blocking body that is pressed against the outer surface of the pipe body.

Since the movement blocking body is comprised with a pair of edge portions that are pressed against an outer surface of the pipe body and that are provided in a condition in which they are located at a specified interval in the pipe axial direction, movements of the pipe body in the pipe axial direction owing to non-averaged force may be blocked through the cutting-in actions of either one edge portion with respect to the pipe body even when the pipe body tries to move in any one direction in the pipe axial directions. With this arrangement, it is possible to block movements of the pipe body and to receive non-averaged force. It is accordingly possible to comprise a firm protection work.

It was accordingly possible to provide a supporting device for non-averaged force in a pipeline with which it is possible to support non-averaged force in a pipeline and to achieve protection.

Still further characteristic components of the supporting device for non-averaged force according to the present invention are:

a frame, which is fixed to a supporting portion, and
a fixing mechanism, which serves to fix a pipe body to the frame,
wherein the fixing mechanism is arranged in that the frame is provided with a first receiving portion provided with an edge portion for receiving an outer surface of the pipe body from one side in a radial direction of the pipe body by pinching the pipe body, and in that a second receiving portion, which is provided with an edge portion for receiving an outer surface of the pipe body from the other side in the radial direction of the pipe body, is provided to be freely coupled to and released from the coupling with respect to the first receiving portion.

According to this arrangement, the first receiving portion and the second receiving portion are linked in a condition in which the first receiving portion and the second receiving portion provided at the frame pinch the pipe body between.

As a result, the edge portion of the first receiving portion and the edge portions of the second receiving portion act to cut into the pipe body so as to block movements of the pipe body and to receive the non-averaged force. With this arrangement, it is possible to comprise a firm protection work.

It was accordingly possible to provide a supporting device for non-averaged force in a pipeline with which it is possible to support non-averaged force in a pipeline and to achieve protection.

It is preferable that the edge portion is set in a posture in which it is in line with a peripheral direction of the first receiving portion or the second receiving portion, and that a plurality thereof is disposed at specified intervals in the peripheral and an axial core direction of the first receiving portion or the second receiving portion.

According to this arrangement, since the edge portion is set in a posture in which it is in line with the peripheral direction of the first receiving portion or the second receiving portion, and a plurality thereof is disposed at specified intervals in the peripheral and the axial core direction of the first receiving portion or the second receiving portion, forming of the edge portions will not be troublesome, and it is moreover possible to prevent cases in which the edge portions cut into only a part of the pipe body or in which the edge portions cut into some part of the pipe body at a force weaker than a specified force. It is also possible to effectively prevent movements of the pipe body in the axial core direction.

It was accordingly possible to provide a supporting device for non-averaged force in a pipeline with which it is possible to more reliably support non-averaged force in a pipeline and to achieve protection.

It is preferable that the edge portion is set in a posture in which it is in line with a peripheral direction of the first receiving portion or the second receiving portions, and that a plurality thereof is disposed at specified intervals in an axial core direction of the first receiving portion or the second receiving portion.

According to this arrangement, since the edge portion is set in a posture in which it is in line with the peripheral direction of the first receiving portion or the second receiving portion, and a plurality thereof is disposed at specified intervals in the axial core direction of the first receiving portion or the second receiving portion, forming of the edge portions will not be troublesome, and it is moreover possible to prevent cases in which the edge portions cut into only a part of the pipe bodies or in which the edge portions cut into some part of the pipe body at a force weaker than a specified force. It is also possible to effectively prevent movements of the pipe body in the axial core direction.

It was accordingly possible to provide a supporting device for non-averaged force in a pipeline with which it is possible to more reliably support non-averaged force in a pipeline and to achieve protection.

It is preferable that the edge portion is set in a posture in which it is inclined with respect to an axial core direction of the first receiving portion or the second receiving portion, and that a plurality thereof is disposed at specified intervals in the peripheral and the axial core direction of the first receiving portion or the second receiving portion.

According to this arrangement, since the edge portion is set in a posture in which it is inclined with respect to the peripheral direction of the first receiving portion or the second receiving portion, and a plurality thereof is disposed at specified intervals in the peripheral and the axial core direction of the first receiving portion or the second receiving portion, it will be easier to block movements of the pipe body in the axial core direction, and it is moreover possible to prevent cases in which the edge portions cut into only a part of the pipe body or in which the edge portions cut into some part of the pipe body at a force weaker than a specified force. It is also possible to effectively prevent rotation of the pipe body about the axial core.

It was accordingly possible to provide a supporting device for non-averaged force in a pipeline with which it is possible to more reliably support non-averaged force in a pipeline and to achieve protection.

It is alternatively possible that the edge portions of a posture that is in line with the peripheral direction of the first receiving portion or the second receiving portion and the edge portions of a posture that is inclined with respect to the axial core direction of the first receiving portion or the second receiving portion are mixed.

According to this arrangement, since both of the edge portions of a posture that is in line with the peripheral direction of the first receiving portion or the second receiving portion and the edge portions of a posture that is inclined with respect to the axial core direction of the first receiving portion or the second receiving portion are mixed, it will be easier to block movements of the pipe body in the axial core direction, and it is moreover possible to prevent cases in which the edge portions cut into only a part of the pipe body or in which the edge portions cut into some part of the pipe body at a force weaker than a specified force. It is also possible to effectively prevent rotation of the pipe body about the axial core.

It was accordingly possible to provide a supporting device for non-averaged force in a pipeline with which it is possible to more reliably support non-averaged force in a pipeline and to achieve protection.

Still further characteristic components of the supporting device for non-averaged force according to the present invention are:
  a frame, which is fixed to a supporting portion, and
  a fixing mechanism, which serves to fix a pipe body to the frame,
  wherein the fixing mechanism is arranged in that a movement blocking body is provided that is capable of blocking movements of the pipe body in a pipe axial direction upon being pressed against an outer surface of the pipe body through pressing force acting from the frame towards the pipe body,
  the movement blocking body being arranged in that three or more edge portions, which are pressed against the outer surface of the pipe body, are provided on a blocking main body portion in a condition in which they are located at specified intervals in the pipe axial direction, or alternatively, one edge portion, which is pressed against the outer surface of the pipe body, is provided on the blocking main body portion.

According to this arrangement, the pipe body and the frame may be integrated through the movement blocking body that is pressed against the outer surface of the pipe body.

Since the movement blocking body is arranged in that three or more edge portions, which are pressed against the outer surface of the pipe body, are provided on a blocking main body portion in a condition in which they are located at specified intervals in the pipe axial direction, or alternatively, one edge portion, which is pressed against the outer surface of the pipe body, is provided on the blocking main body portion, movements of the pipe body in the pipe axial direction owing to non-averaged force may be blocked through the cutting-in actions of the edge portions with respect to the pipe bodies even when the pipe body tries to move in any one direction in the pipe axial direction, and it is thus possible to block movements of the pipe body and to receive non-averaged force. It is accordingly possible to comprise a firm protection work.

It was accordingly possible to provide a supporting device for non-averaged force in a pipeline with which it is possible to support non-averaged force in a pipeline and to achieve protection.

Still further characteristic components of the supporting device for non-averaged force according to the present invention are:
  a ring body, which encloses a pipe body,
  a plurality of pressing portions, which press the pipe body from outside in a radial direction while being dispersed in a peripheral direction of the ring body,
  a frame, which is provided as a separate body than the ring body and is fixed to a fixing portion, and
  a supporting portion, which is provided at the frame for supporting the ring body.

According to this arrangement, the ring body may be integrated to the pipe body upon pressing the pipe body from outside in a radial direction by means of the plurality of pressing portions of the ring body while the ring body may be supported through the supporting portion provided at the frame that is fixed to the fixing portion.

With this arrangement, it is possible to block movements of the pipe body in a pipe axial direction owing to non-averaged force and to comprise a firm protection work.

In an arrangement in which the ring body is integrally formed with the frame body and the integral body is to be formed through casting or similar methods, the mold will be of complicated shape so that manufacture thereof will be troublesome, whereas the present arrangement is such that the ring body is provided separate from the frame so that the mold may be of simple shape to enable easy manufacture (even if manufacture is performed through methods other than casting, it is possible to perform easy manufacture similar to the above case when employing the above arrangement).

It was accordingly possible to provide a supporting device for non-averaged force in a pipeline with which it is possible to support non-averaged force in a pipeline and to achieve protection while manufacture thereof may be performed in an easy and less costly manner.

It is preferable that a belt body for fastening the pipe body is provided and that the frame, which is formed to be separate from the belt body and which is fixed to a fixing portion, is provided with a supporting portion for supporting the belt body.

According to this arrangement, the belt body may be integrated with the pipe bodies upon fastening the pipe body through the belt body and the belt body is supported by the supporting portion provided at the frame that is fixed to the fixing portion.

With this arrangement, movements of the pipe body in the pipe axial direction owing to non-averaged force may be blocked, and it is possible to comprise a firm protection work.

In an arrangement in which the belt body is integrally formed with the frame body and the integral body is to be formed through casting or similar methods, the mold will be of complicated shape so that manufacture thereof will be troublesome, whereas the present arrangement is such that the belt body is provided separate from the frame so that the mold may be of simple shape to enable easy manufacture (even if manufacture is performed through methods other than casting, it is possible to perform easy manufacture similar to the above case when employing this arrangement).

It was accordingly possible to provide a supporting device for non-averaged force in a pipeline with which it is possible to support non-averaged force in a pipeline and to achieve protection while manufacture may be performed in an easy and less costly manner.

It is preferable that the supporting portion is arranged in that a concave portion for receiving and accumulating a portion of the ring body portion or a portion of the belt body is provided at the frame.

According to this arrangement, the supporting portion is arranged in that a concave portion for receiving and accumulating a portion of the ring body portion or a portion of the belt body is provided at the frame so that operations for supporting the portion of the ring body portion or the portion of the belt body at the concave portion (that is, for accumulating the portion of the ring body portion or the portion of the belt body into the concave portion) may be easily performed.

It is preferable that the frame is arranged by mutually coupling a pair of separated frames made of an angle member disposed in a condition in which they are aligned in the pipe axial direction of the pipe body, and that the supporting portion is arranged in that a first restricting portion for receiving and restricting the ring body in vertical directions, a second restricting portion for receiving and restricting the same from outside in lateral directions, and a third restricting portion for receiving and restricting the same in the axial core direction of the pipe body are provided at the respective separated frames.

With this arrangement, the ring body may be integrated with the pipe body upon pressing the pipe body from outside in the radial direction by means of the plurality of pressing portions of the ring body while the ring body is supported by the supporting portion provided at the frame that is fixed at the fixing portion.

That is, the ring body is received and restricted in vertical directions by the first restricting portion, received and restricted from outside in lateral directions by the second restricting portion, and received and restricted in the axial core direction of the pipe body by the third restricting means that are provided at the respective separated frames. The pair of separated frames is then coupled with each other.

With this arrangement, movements of the pipe body in the pipe axial direction owing to non-averaged force may be blocked, and it is possible to comprise a firm protection work.

In an arrangement in which the ring body is integrally formed with the frame body and the integral body is to be formed through casting or similar methods, the mold will be of complicated shape so that manufacture thereof will be troublesome, whereas the present arrangement is such that the ring body is provided separate from the frames and that the frames are formed by using an angle member so that the ring body and the frames may be easily manufactured.

In case the frames are formed of an angle member, the frames may be easily manufactured on-site while the height of the supporting portion may also be easily set to meet the height of the pipe body at the site.

It was accordingly possible to provide a supporting device for non-averaged force in a pipeline with which it is possible to support non-averaged force in a pipeline and to achieve protection manufacture may be performed in an easy and less costly manner.

DETAILED DESCRIPTION OF THE PREFERRED EMBODIMENTS

Embodiments of the present invention will now be explained with reference to the drawings.

First Embodiment

Figure 46:
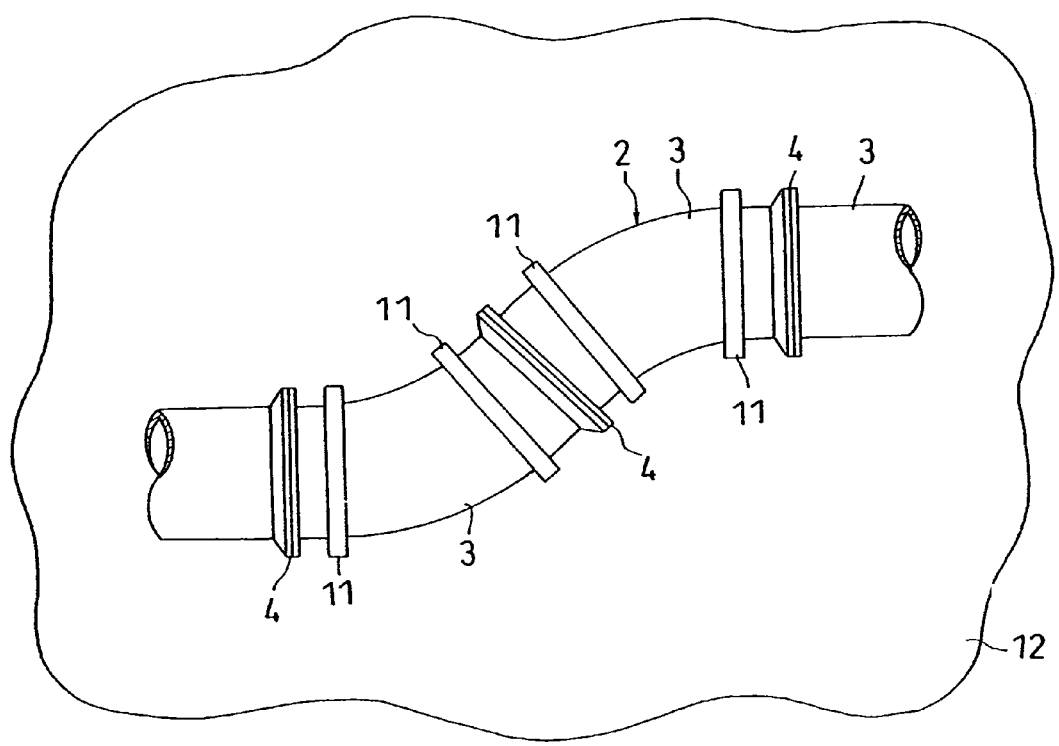
FIG. 46 is a plan view illustrating an example of a pipeline within a utility tunnel employing the supporting device of the present invention.
Figure 47:
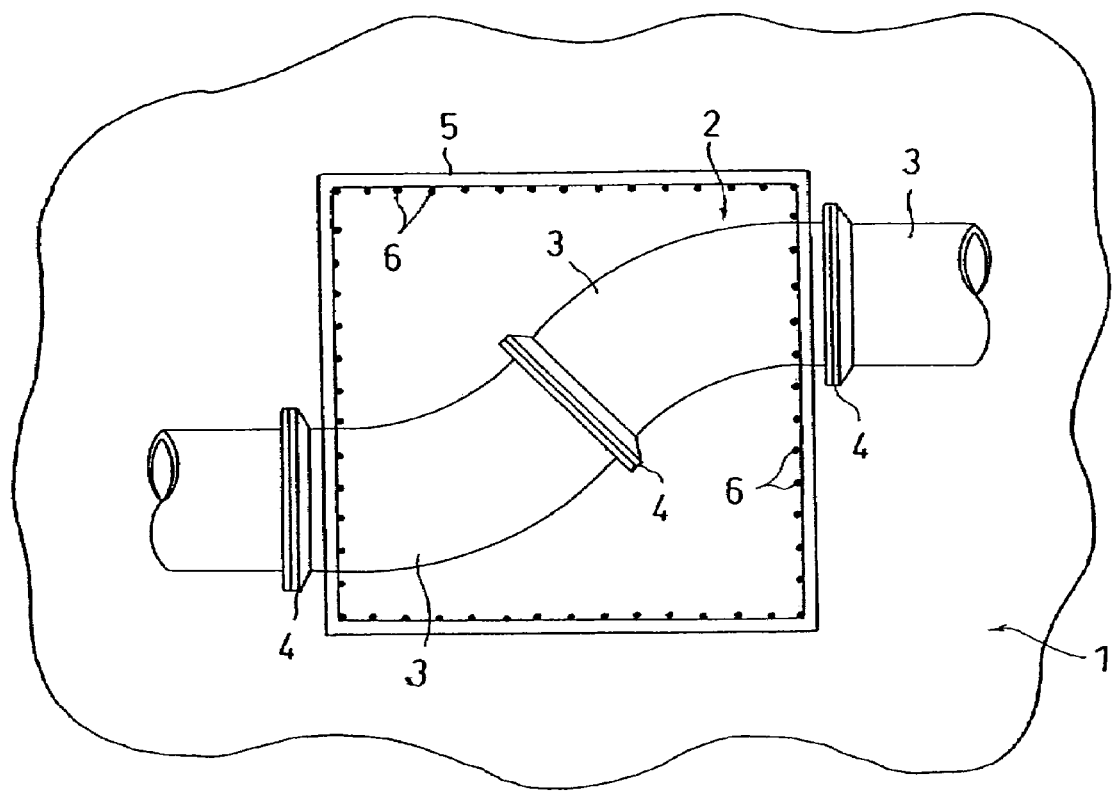
FIG. 47 is a plan view illustrating a prior art example of a pipeline within a utility tunnel.
Figure 48:
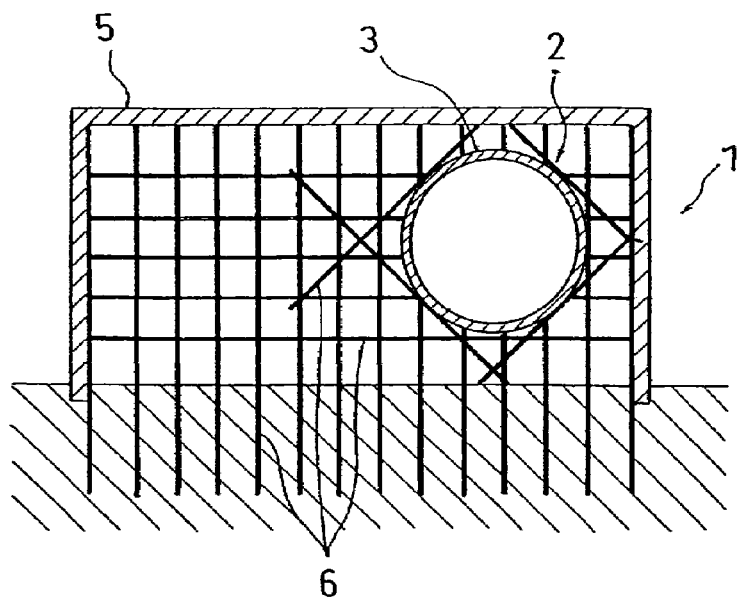
FIG. 48 is a side view of the part illustrated in FIG. 47.

A pipeline 2 comprised of pipe bodies 3 provided with joint portions 4 is disposed within a utility tunnel as illustrated in FIG. 46. The pipe bodies 3 are supported by the supporting device for non-averaged force in a pipeline according to the present embodiment.

The supporting device for non-averaged force in a pipeline will now be explained. As illustrated in FIGS. 1 to 4, the supporting device for non-averaged force in a pipeline is comprised by providing a frame 11 made of cast iron that is fixed onto a base concrete 12 of a utility tunnel (which comprises a supporting portion) and a fixing mechanism 23 for fixing a pipe body 3 to the frame 11.

The fixing mechanism 23 is provided with metallic wedge bodies 20 which are capable of blocking movements of the pipe body 3 with respect to the frame 11 in the pipe axial direction when being pressed against an outer surface of the pipe body 3 through pressuring force acting from the frame 11 onto the pipe body 3.

The frame 11 is comprised by integrally forming a plate-like mounting seat portion 14, a pipe supporting portion 15 rising up from the mounting seat portion 14, and a rib 16 that is in line with the pipe axial direction. A round hole portion 17 for piercing the pipe bodies 3 through is formed through the pipe supporting portion 15.

<Structure of the Fixing Mechanism 23>

The fixing mechanism 23 will be further explained in details. A plurality of wedge body accumulating portions 18A, 18B are integrally formed at peripheries of hole portions 17 on both end portion sides of the pipe supporting portion 15 in the pipe axial direction. Each of the wedge body accumulating portions 18A, 18B is formed to project from the pipe supporting portion 15 in the pipe axial direction, and wedge body accumulating concave portions 19 facing the outer surface of the pipe body 3 are formed in the interior thereof as illustrated in FIG. 2.

The wedge bodies 20 are accumulated in the respective wedge body accumulating concave portions 19. That is, a plurality of the wedge bodies 20 are disposed at specified intervals in the pipe axial direction and the posture of the respective wedge bodies 20 is set such that directions of wedge actions of one pair of wedge bodies 20 adjoining in the pipe axial direction are directed in opposite directions with respect to each other in the pipe axial direction.

The wedge bodies 20 are pressed against tip end portions of pressing bolts 21 screwed into wall portions of the wedge body accumulating portions 18A, 18B. One surface of each wedge body 20 contacts an outer surface of the pipe body 3. The pressing bolts 21 are inclined with respect to the pipe body 3 to correspond to the shape of the wedge bodies 20.

Figure 1:
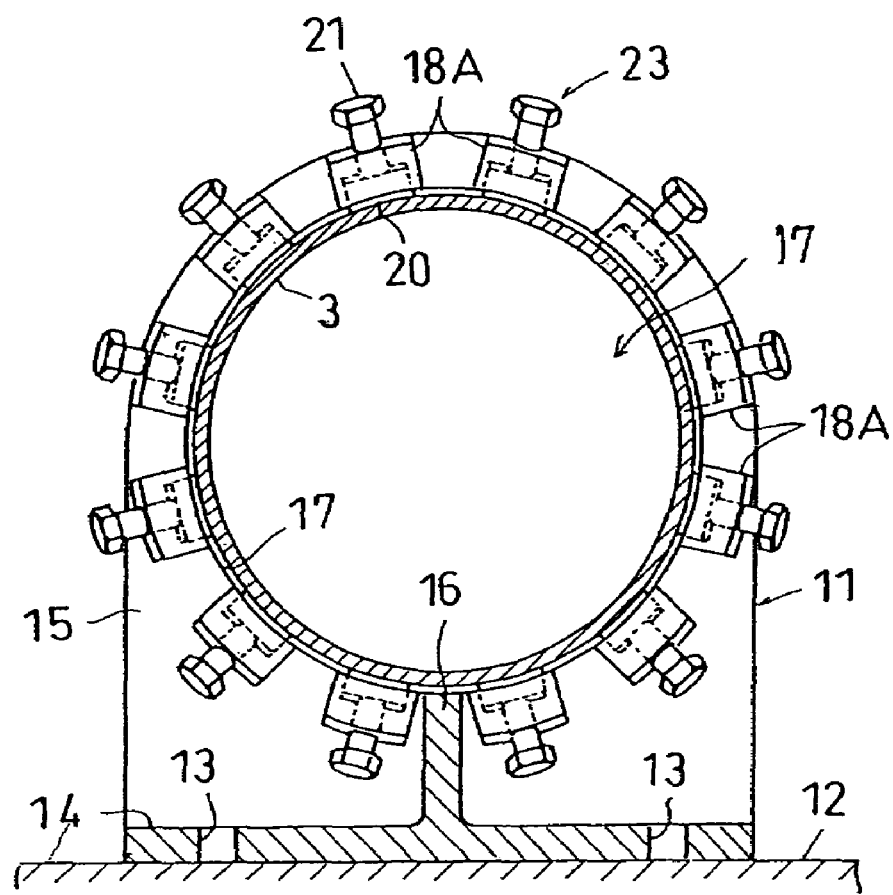
FIG. 1 is a side view of the supporting device for non-averaged force in a pipeline.
Figure 2:
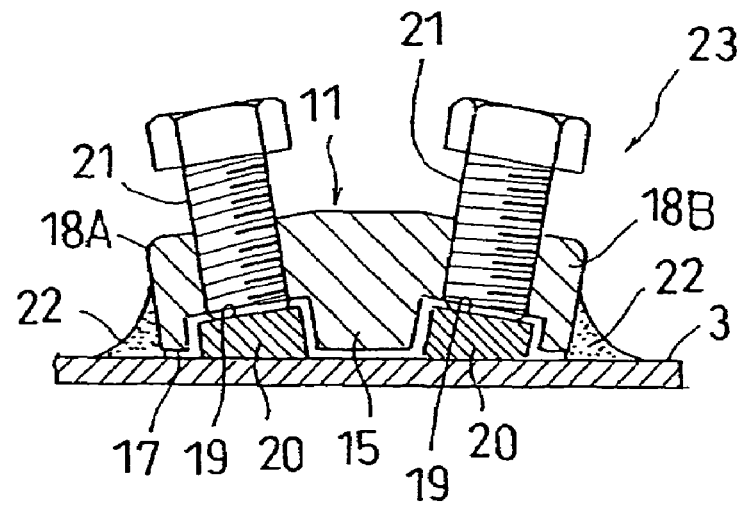
FIG. 2 is a longitudinal sectional view of a main portion of the supporting device of FIG. 1.
Figure 3:
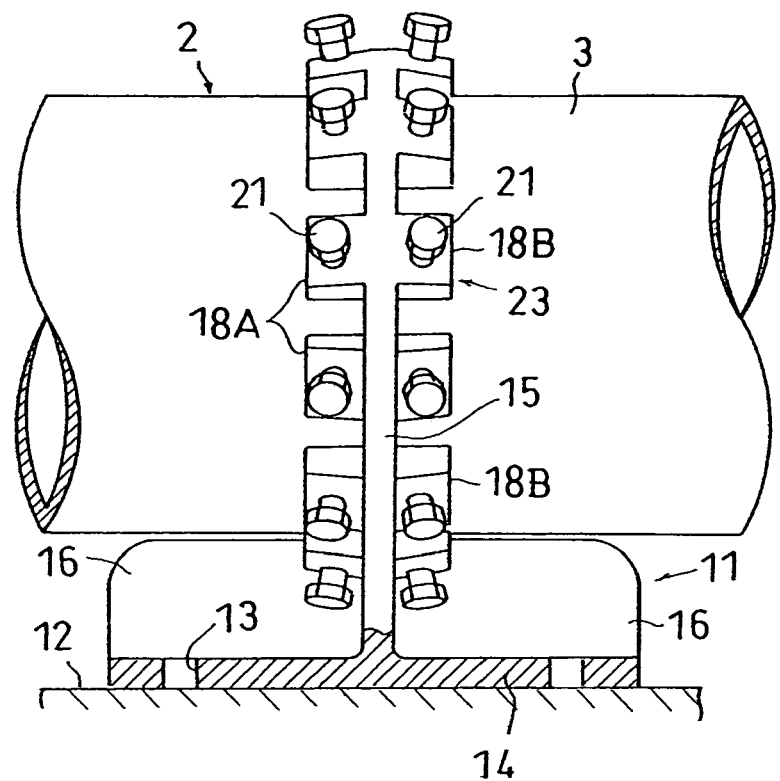
FIG. 3 is a front view of the supporting device of FIG. 1.
Figure 4:
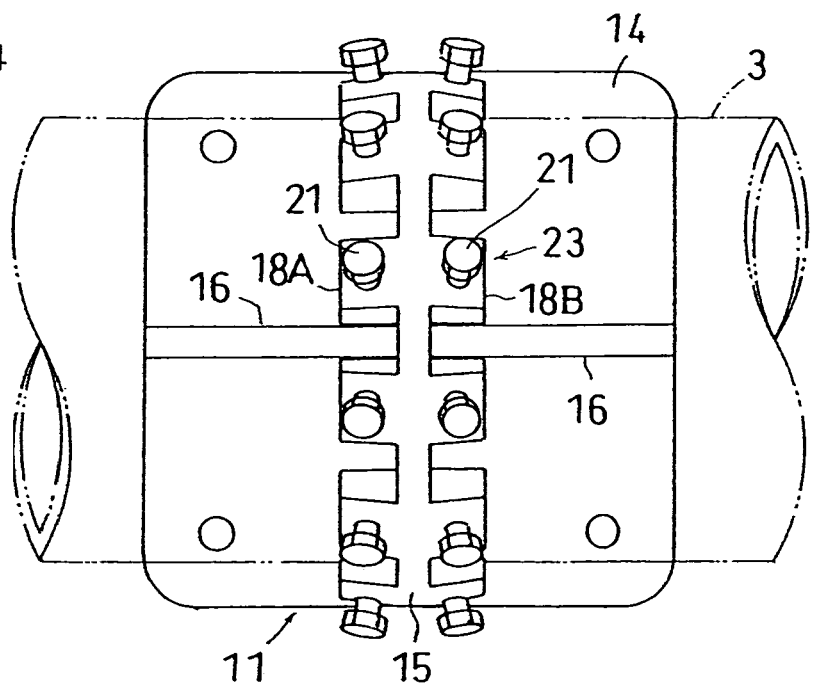
FIG. 4 is a plan view of the supporting device of FIG. 1.

Reference numerals 22 in FIG. 2 denote caulking materials for filling clearances between the outer surface of the wedge body accumulating portions 18A, 18B and the outer surface of the pipe body 3 and thus achieving anti-corrosive effects.

The fixing mechanism 23 is arranged in this manner.

When the pipe body 3 is to be supported inside of the utility tunnel by the supporting device according to this embodiment, the frame 11 is fixed on a specified position of the base concrete 12 by using anchor bolts (reference numerals 13 denote anchor bolt piercing holes), and the pipeline 2 is laid in a condition in which the pipe body 3 is pierced through the hole portion 17 of the pipe supporting portion 15 of the frame 11.

The pipe supporting portion 15 may be of a two-split arrangement in the radial direction of the hole portion 17. In this case, construction is performed by first laying the pipeline 2 and then covering the upper half of the pipe supporting portion 15 onto the pipe body 3.

Prior to piercing the pipe body 3 into the hole portion 17, the wedge bodies 20 are preliminarily accumulated into the accumulating portions 18A, 18B and are temporarily fastened by using suitable means.

Thereafter, the pressing bolts 21 are operated in a rotating manner for pressing the wedge bodies 20 through the pressing bolts 21 whereupon the wedge bodies 20 will be pinched between the pressing bolts 21 and the pipe body 3 in a pressed condition.

That is, the wedge bodies 20 will be pinched between the frame 11 and the pipe body 3 through the wedge body accumulating portions 18A, 18B and the pipe supporting portion 15 in a pressed condition.

In case the non-averaged force becomes larger in the above supporting device, the pipe body 3 will act to slip off from the joint portion 4 whereupon the pipe body 3 tries to move in the pipe axial direction with respect to the frame 11.

However, since the wedge bodies 20 are set in that the posture of the wedge bodies 20 is arranged in a condition in which the directions of wedge actions of one pair of wedge bodies 20 adjoining in the pipe axial direction will be opposite with respect to each other in the pipe axial direction, either one of the wedge bodies 20 will act even if the pipe body 3 tries to move in either direction.

It is accordingly possible to block such movements of the pipe body 3 and to receive non-averaged force.

Second Embodiment

The supporting device for non-averaged force in a pipeline according to this embodiment differs from the supporting device of the above first embodiment in the arrangement of the fixing mechanism (and the same applies also for the third embodiment, the fourth embodiment, the fifth embodiment and the sixth embodiment that will be described later). The different arrangement will now be explained.

Figure 5:
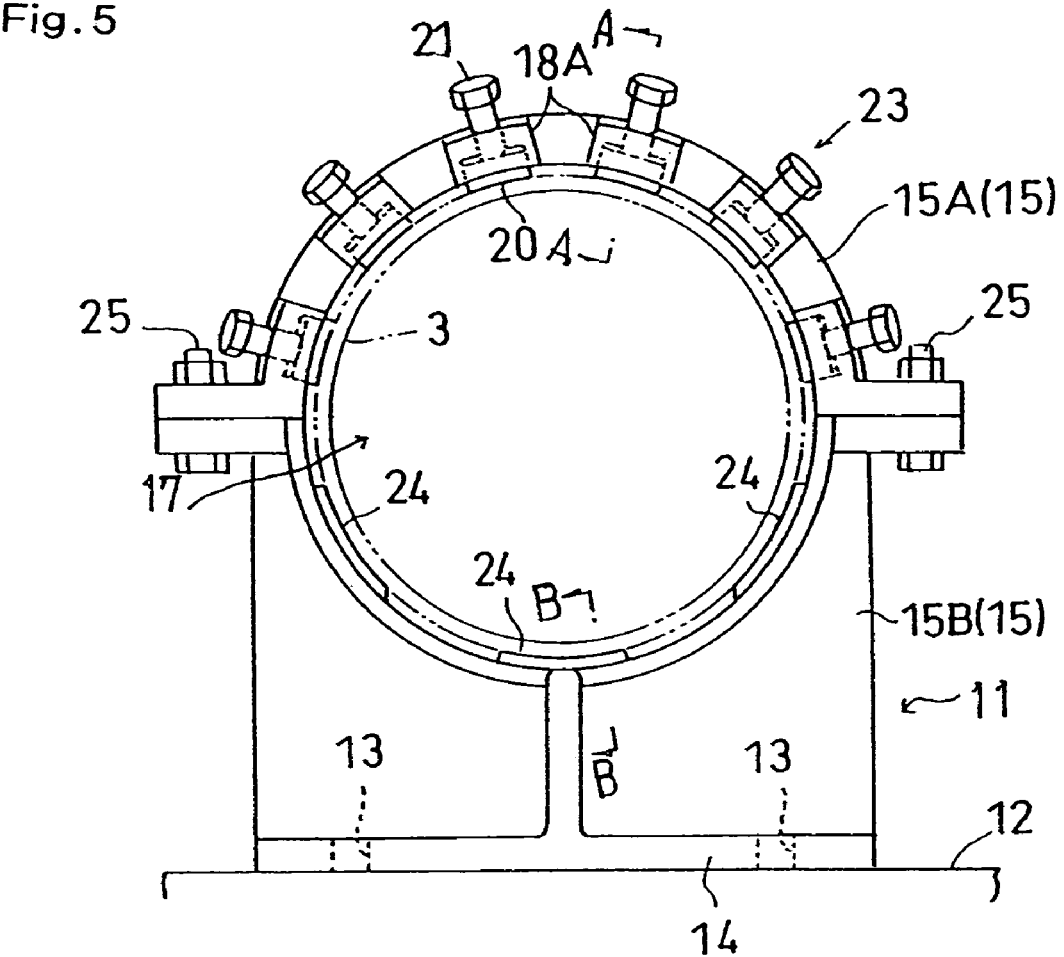
FIG. 5 is a side view of the supporting device for non-averaged force in a pipeline according to a second embodiment.
Figure 6:
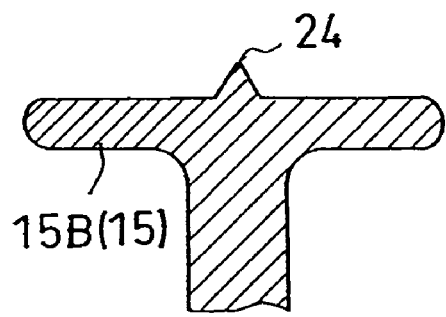
FIG. 6 is a view seen from B-B in FIG. 5.
Figure 7:
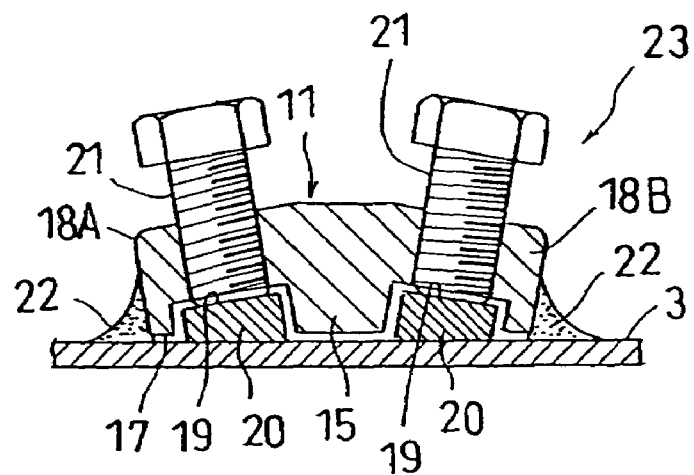
FIG. 7 is a view seen from A-A in FIG. 5.
Figure 8:
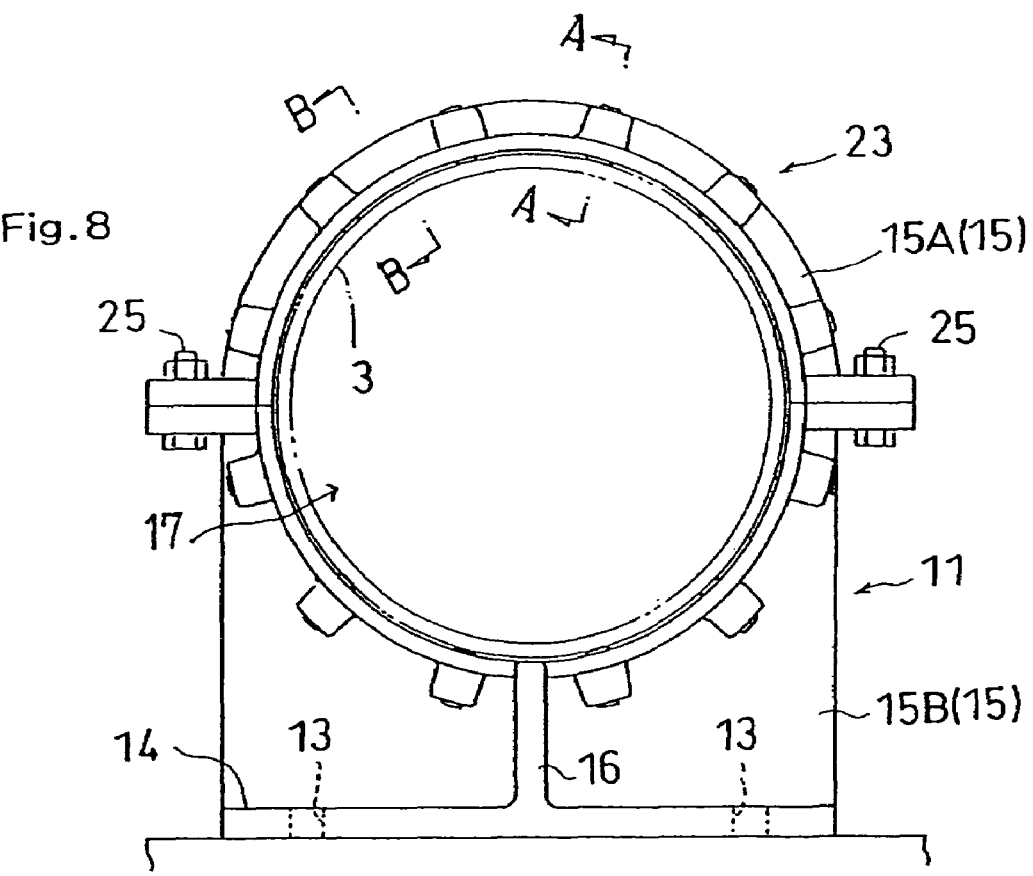
FIG. 8 is a side view of the supporting device for non-averaged force in a pipeline according to a third embodiment.
Figure 9:
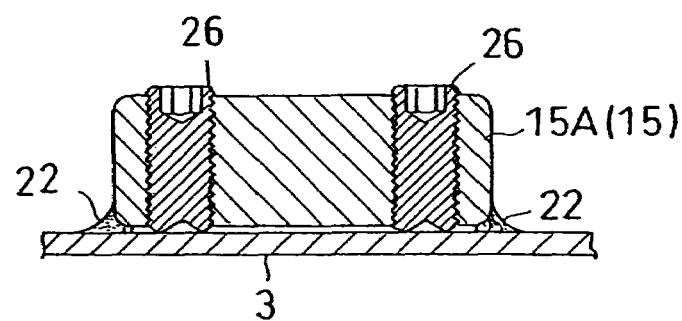
FIG. 9 is a view seen from A-A in FIG. 8.
Figure 10:
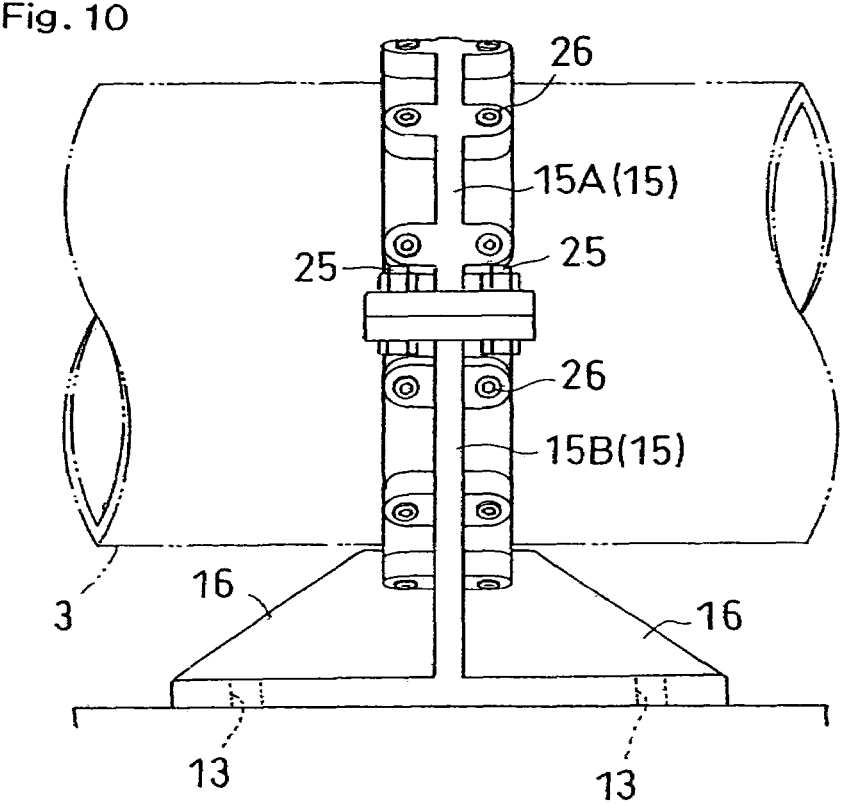
FIG. 10 is a front view of the supporting device of FIG. 8.
Figure 11:
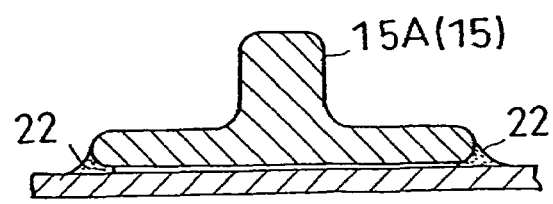
FIG. 11 is a view seen from B-B in FIG. 8.
Figure 12:
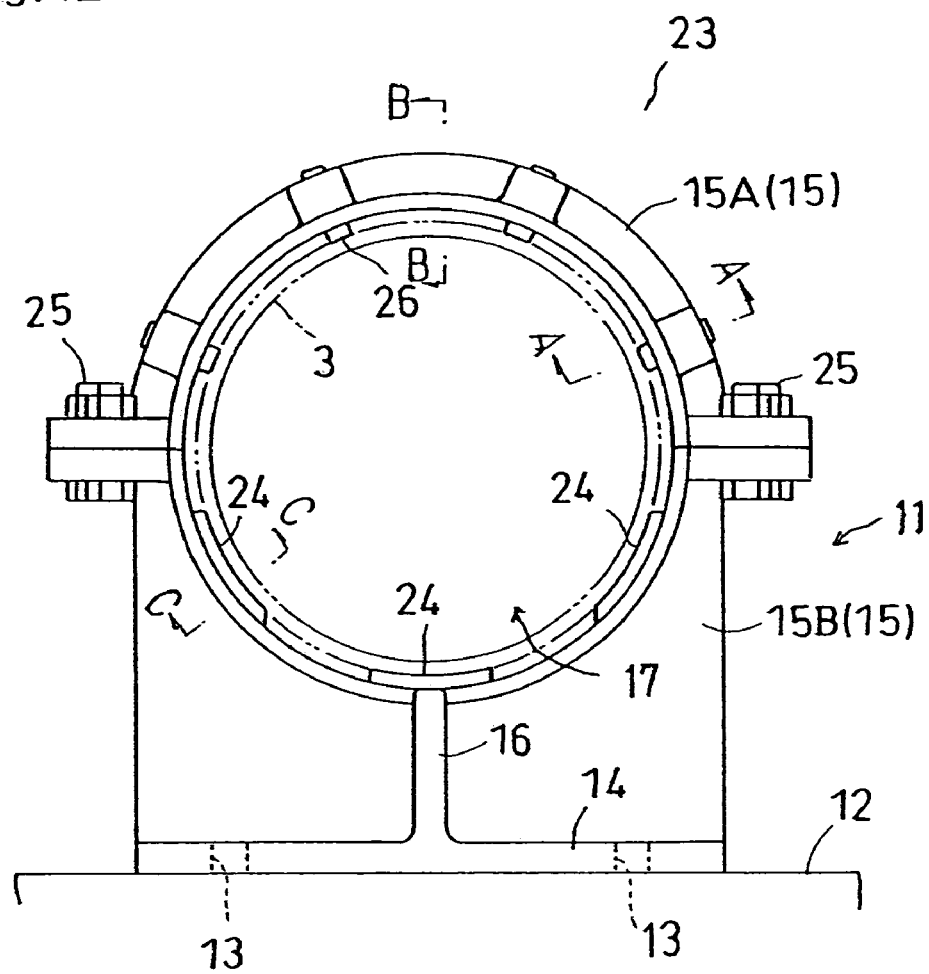
FIG. 12 is a side view of the supporting device for non-averaged force in a pipeline according to a fourth embodiment.
Figure 13:
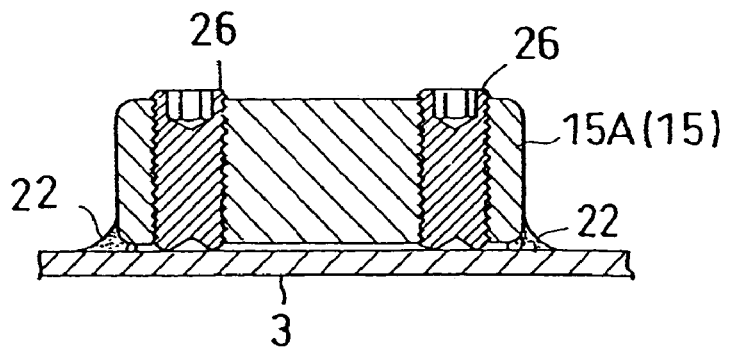
FIG. 13 is a view seen from A-A in FIG. 12.
Figure 14:
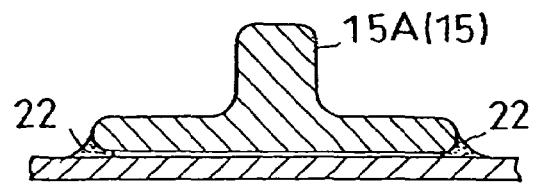
FIG. 14 is a view seen from B-B in FIG. 12.
Figure 15:
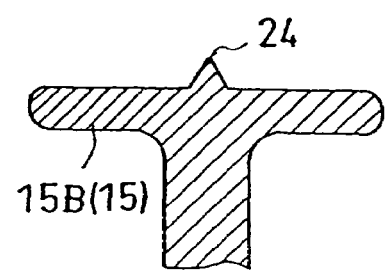
FIG. 15 is a view seen from C-C in FIG. 12.
Figure 16:
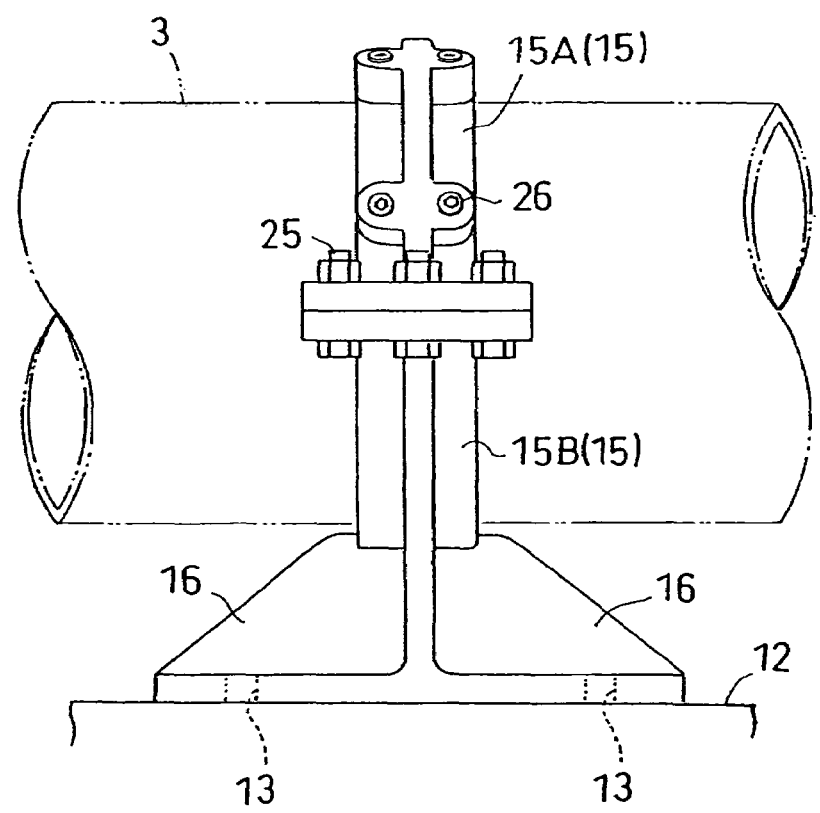
FIG. 16 is a front view of the supporting device of FIG. 12.

As illustrated in FIGS. 5 to 7, the pipe supporting portion 15 of the frame 11 is two-split in the radial direction of the hole portion 17 and the pair of separated pipe supporting portions 15A, 15B are coupled together by means of coupling bolts 25.

The fixing mechanism 23 is arranged in that a plurality of edge portion 24 for receiving an outer surface of the pipe body 3 from one side in the radial direction of the pipe body 3 while pinching the pipe body 3 is formed on an inner peripheral portion of the hole portion 17 of the lower separated pipe supporting portion 15B at specified intervals in the peripheral direction. The edge portions 24 are set in a posture in which they are in line with the peripheral direction of the hole portion 17.

The upper separated pipe supporting portion 15A is provided with wedge bodies 20. The wedge bodies 20 and their peripheral arrangements being identical to the arrangements of those of the first embodiment, explanations thereof will be omitted.

According to this arrangement, the pipe body 3 and the frame 11 will be integrated through the edge portions 24 and the wedge bodies 20 that are pressed against the outer surface of the pipe body 3. Moreover, movements of the pipe body 3 in the pipe axial direction owing to non-averaged force may be blocked by the wedge actions of the wedge bodies 20 and the cutting-in actions of the edge portions 24 with respect to the outer surface of the pipe body 3. With this arrangement, it is possible to obtain a firm protection work.

While the wedge bodies 20 of the second embodiment are pressed by tip end portions of pressing bolts 21 screwed into wall portions of the wedge body accumulating portions 18A, 18B, the following alternative arrangement may also be employed.

The wedge bodies 20 are pressed against an inner peripheral surface of wedge body accumulating concave portions 19 (reference should be made to FIG. 2) without providing pressing bolts 21. In this case, pressing force acting on the wedge bodies 20 is generated through tightening force of the coupling bolts 25 with respect to the pair of separated pipe supporting portions 15A, 15B.

Third Embodiment

This embodiment is arranged in that the pipe supporting portion 15 of the frame 11 is two-split in the radial direction of the hole portion 17 as illustrated in FIGS. 8 to 11 whereupon the pair of separated pipe supporting portions 15A, 15B are coupled with respect to each other through coupling bolts 25.

The fixing mechanism 23 is arranged in that a plurality of male screw members 26, which are capable of blocking movements of the pipe body 3 in the pipe axial direction with respect to the frame 11 in a condition in which they press the outer surface of the pipe body 3 at their tip end portions while being screwed into a plurality of female screw portions formed in the separated pipe supporting portions 15A, 15B, are provided to be dispersed in the peripheral direction while being aligned in rows of two in the pipe axial direction. The male screw members 26 are indented at their tip end portions so that they may easily cut into the outer surface of the pipe body 3.

According to this arrangement, the pipe body 3 and the frame 11 are integrated through the male screw members 26 that are pressed against the outer surface of the pipe body 3. Movements of the pipe body 3 with respect to the pipe axial direction owing to non-averaged force may be reliably blocked through the pressing force of the male screw members 26. It is accordingly possible to obtain a firm protection work.

While the pipe supporting portion 15 of the frame 11 has been arranged to be of a two-split structure in the radial direction of the hole portion 17 in the third embodiment, it is alternatively possible to arrange the same of an integral structure without splitting the same into two.

Fourth Embodiment

This embodiment is arranged in that the pipe supporting portion 15 of the frame 11 is two-split in the radial direction of the hole portion 17 as illustrated in FIGS. 12 to 16 whereupon the pair of separated pipe supporting portions 15A, 15B are coupled with respect to each other through coupling bolts 25.

The fixing mechanism 23 is arranged in that a plurality of edge portions 24 for receiving the outer surface of the pipe body 3 from one side in the radial direction (downward side) of the pipe body 3 by pinching the pipe body 3 are formed on the inner peripheral portion of the hole portion 17 of the lower separated pipe supporting portion 15B at specified intervals in the peripheral direction. The edge portions 24 are set in a posture in which they are in line with the peripheral direction of the pipe body 3.

The upper separated pipe supporting portion 15A is provided with male screw members 26 of the third embodiment. The male screw members 26 and their peripheral arrangements being identical to the arrangements of those of the third embodiment, explanations thereof will be omitted.

According to this arrangement, the pipe body 3 and the frame 11 are integrated through the edge portions 24 and the male screw members 26 that are pressed against the outer surface of the pipe body 3. Moreover, movements of the pipe body 3 with respect to the pipe axial direction owing to non-averaged force may be reliably blocked through the pressing actions of the male screw members 26 and the cutting-in actions of the edge portions 24 with respect to the outer surface of the pipe body 3. It is accordingly possible to obtain a firm protection work.

Fifth Embodiment

Figure 17:
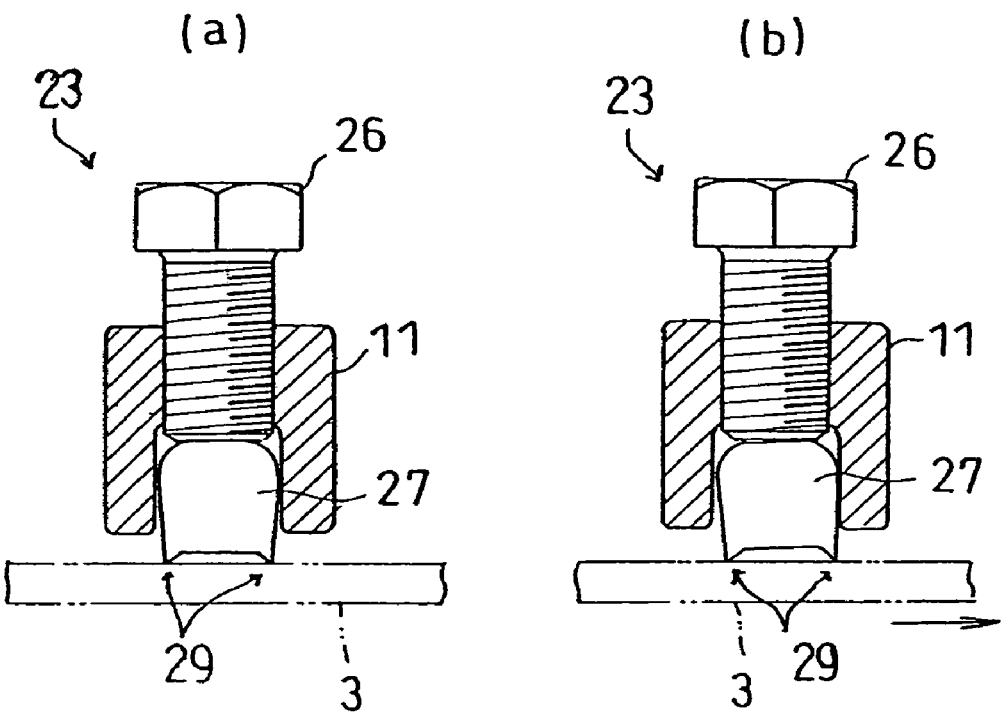
FIG. 17 is a sectional view of a main portion of a fifth embodiment.

As illustrated in FIG. 17(a), the fixing mechanism 23 of this embodiment is arranged in that a movement blocking body 27 is provided that is capable of blocking movements of the pipe body 3 in the pipe axial direction with respect to the frame 11 when being pressed against the outer surface of the pipe body 3 through pressing force of a pressing screw 26 acting from the frame 11 towards the pipe body 3. The movement blocking body 27 is comprised with a pair of edge portions 29 that are pressed against the outer surface of the pipe body 3 when being located at specified intervals in the pipe axial direction.

According to this arrangement, the pipe body 3 and the frame 11 may be integrated through the movement blocking body 27 that is pressed against the outer surface of the pipe body 3.

Since the movement blocking body 27 is comprised with a pair of edge portions 29 that are pressed against the outer surface of the pipe body 3 when being located at specified intervals in the pipe axial direction, either one edge portion 29 will act even when the pipe body 3 tries to move in either direction of the pipe axial direction (reference should be made to FIG. 17(b)), so that movements of the pipe body 3 may be accordingly blocked to receive the non-averaged force.

Sixth Embodiment

Figure 18:
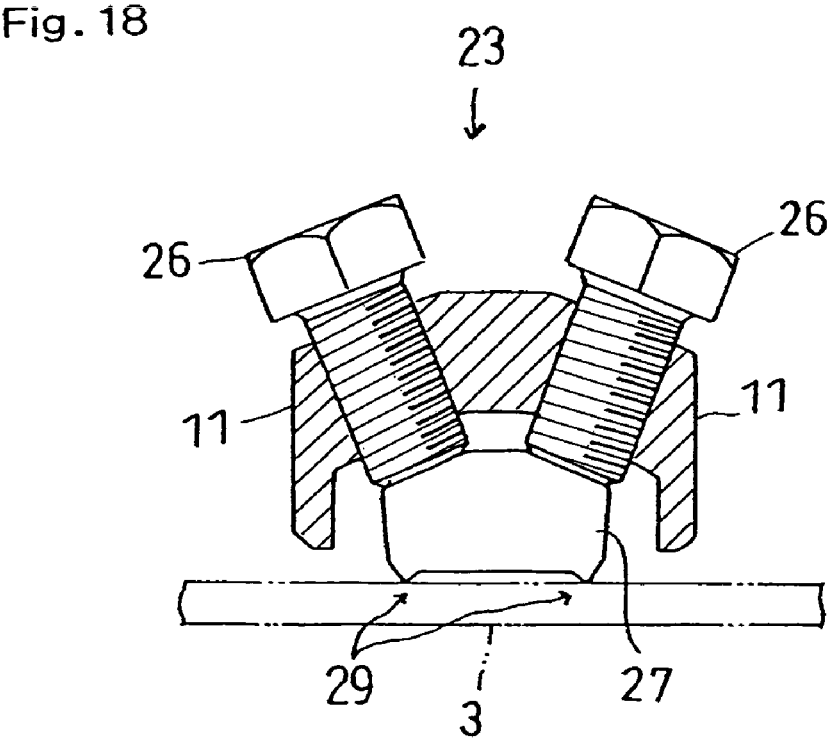
FIG. 18 is a sectional view of a main portion of a sixth embodiment.

As illustrated in FIG. 18, the fixing mechanism 23 of this embodiment is arranged in that a movement blocking body 27 is provided that is capable of blocking movements of the pipe body 3 in the pipe axial direction with respect to the frame 11 when being pressed against the outer surface of the pipe body 3 through pressing force of a pair of pressing screws 26 acting from the frame 11 towards the pipe body 3. The movement blocking body 27 is comprised with a pair of edge portions 29 that are pressed against the outer surface of the pipe body 3 when being located at specified intervals in the pipe axial direction.

The pair of pressing edges 26 is set in an inclined posture in which they come closer in approaching tip end sides of the bolts in the pipe axial direction.

According to this arrangement, the pipe body 3 and the frame 11 may be integrated through the movement blocking body 27 that is pressed against the outer surface of the pipe body 3.

Since the movement blocking body 27 is comprised with a pair of edge portions 29 that are pressed against the outer surface of the pipe body 3 when being located at specified intervals in the pipe axial direction, either one edge portion 29 will act even when the pipe body 3 tries to move in either direction of the pipe axial direction so that movements of the pipe body 3 may be accordingly blocked to receive the non-averaged force.

Modified Examples of the First to Sixth Embodiments

In the arrangement in which the pipe supporting portion 15 of the frame 11 is split into two in the radial direction of the hole portion 17 whereupon the pair of separated pipe supporting portions 15A, 15B are coupled by coupling bolts 25, the direction of two-split is not limited in vertical directions, and it is alternatively possible to split the same into two in lateral directions to obtain a left-sided separated pipe supporting portion and a right-sided separated pipe supporting portion.

Alternatively, the edge portions 24 of the above second embodiment and the fourth embodiment may be formed on the upper separated pipe supporting portion 15A while the wedge bodies 20 (or the male screw members 26 in the fourth embodiment) are formed on the lower separated pipe supporting portion 15B.

As a modified example of the fifth embodiment, the edge portions 24 of the second embodiment and the fourth embodiment may be formed on either one of the separated pipe supporting portions (which reference numeral is 15A or 15B in the second and fourth embodiments) while the movement blocking body 27 and the pressing screw 26 are formed on the other separated pipe supporting portion to comprise the fixing mechanism 23.

Seventh Embodiment

The supporting device for non-averaged force in a pipeline according to still another embodiment will now be explained.

Figure 19:
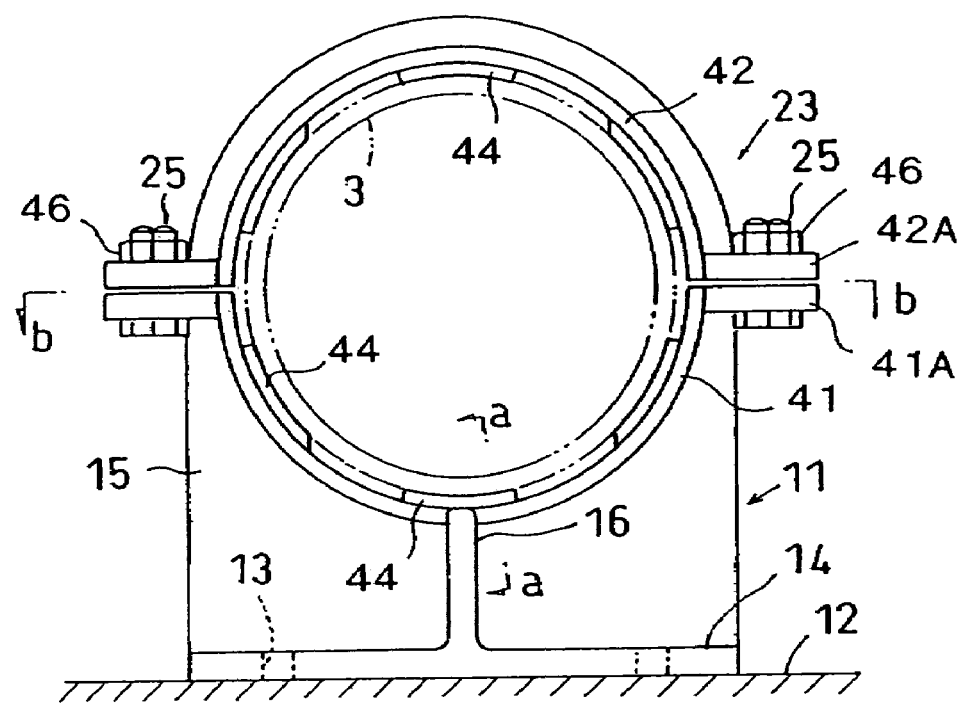
FIG. 19 is a side view of the supporting device for non-averaged force in a pipeline according to a seventh embodiment.
Figure 20:
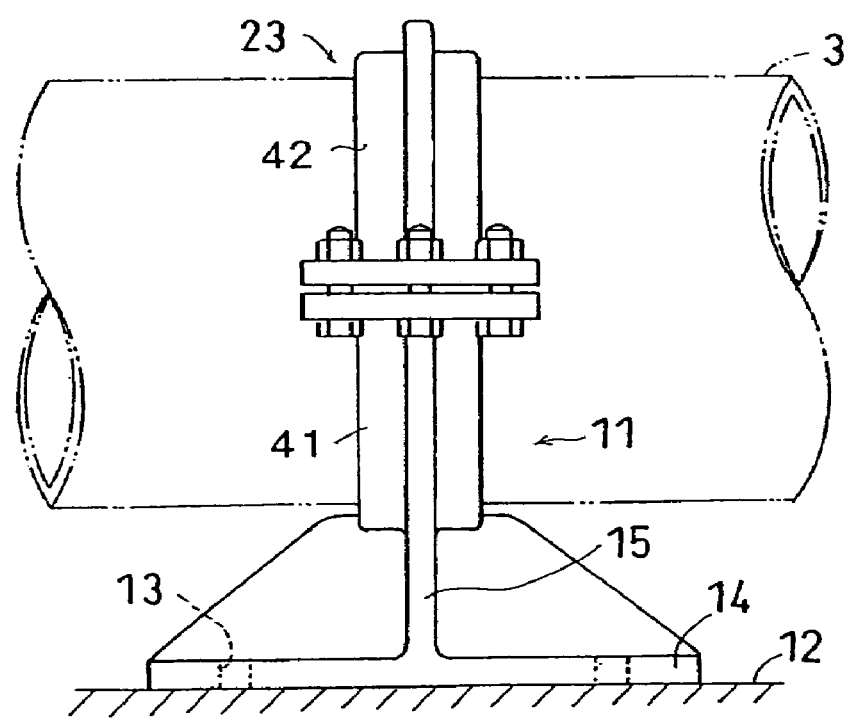
FIG. 20 is a front view of the supporting device of FIG. 19.

As illustrated in FIGS. 19 and 20, this supporting device for non-averaged force in a pipeline is comprised by providing a frame 11 made of cast iron that is fixed onto a base concrete 12 of a utility tunnel (which comprises a supporting portion) and a fixing mechanism 23 for fixing the pipe body 3 to the frame 11.

The fixing mechanism 23 is arranged in that the frame 11 is integrally provided with an arc-like first receiving portion 41 provided with a plurality of edge portions 44 for receiving the outer surface of pipe body 3 from one side (downward side) in the radial direction of the pipe body 3 by pinching the pipe body 3, and in that an arc-like second receiving portion 42, which is provided with a plurality of edge portions 44 for receiving the outer surface of the pipe body 3 from the other side (upward side) in the radial direction of the pipe body 3, is provided to be freely coupled to and released from the coupling with respect to the first receiving portion.

The coupling structure between the second receiving portion 42 and the first receiving portion 41 is arranged as a bolt coupling mechanism in which bolt piercing holes are formed on a flange 41A provided at the first receiving portion 41 and a flange 42A provided at the second receiving portion 42 wherein bolts 25 are pierced through these bolt piercing holes whereupon nuts 46 are screwed to the bolts 25.

The frame 11 is comprised of a plate-like mounting seat portion 14, a pipe supporting portion 15 rising up from the mounting seat portion 14 and a rib 16 that is in line with the pipe axial direction.

Figure 21:
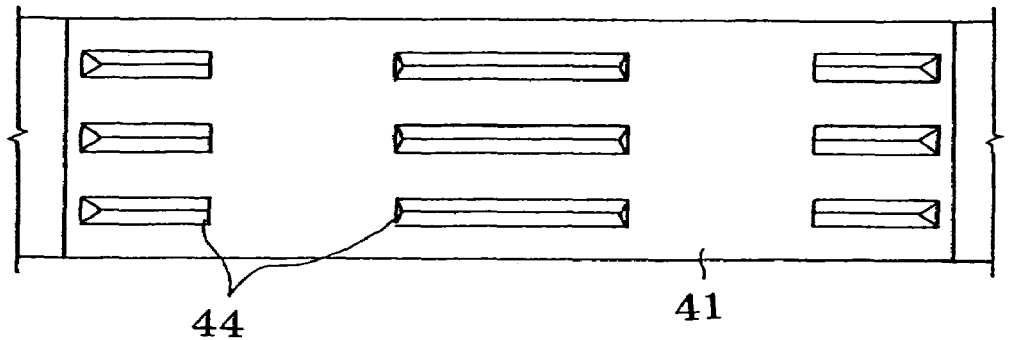
FIG. 21 is a view seen from b-b in FIG. 19.
Figure 22:
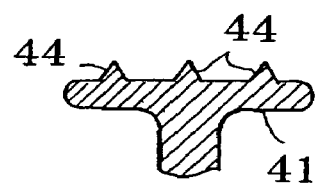
FIG. 22 is a view seen from a-a in FIG. 19.

As illustrated in FIGS. 21 and 22, for setting a pattern for disposing the plurality of edge portions 44, a plurality of edge portions 44 of a posture that are in line with the peripheral direction of the first receiving portion 41 or the second receiving portion 42 is disposed at specified intervals in the peripheral and the axial core direction of the first receiving portion 41 or the second receiving portion 42.

According to this arrangement, when the pipe body 3 is pinched by the arc-like first receiving portion 41 and the arc-like second receiving portion 42 provided at the frame 11 and the bolt coupling mechanism is tightened in this condition, the plurality of edge portions 44 of the first receiving portion 41 and the plurality of edge portions 44 of the second receiving portion 42 act to cut into the pipe body 3. With this arrangement, movements of the pipe body 3 may be blocked for receiving the non-averaged force. It is accordingly possible to obtain a firm protection work.

For example, in case the flange 41A on the first receiving portion 41 side and the flange 42A on the second receiving portion 42 side would be abutting in a condition in which the bolt coupling mechanism is tightened, a drawback will be caused in that cutting-in actions of the plurality of edge portions 44 of the first receiving portion 41 and the plurality of edge portions 44 of the second receiving portion 42 into the pipe body 3 will become difficult. However, since a clearance is formed between the flange 41A on the first receiving portion 41 side and the flange 42A on the second receiving portion 42 side when the bolt coupling mechanism is tightened, such drawbacks may be eliminated.

Modified Example of the Seventh Embodiment

Figure 23:
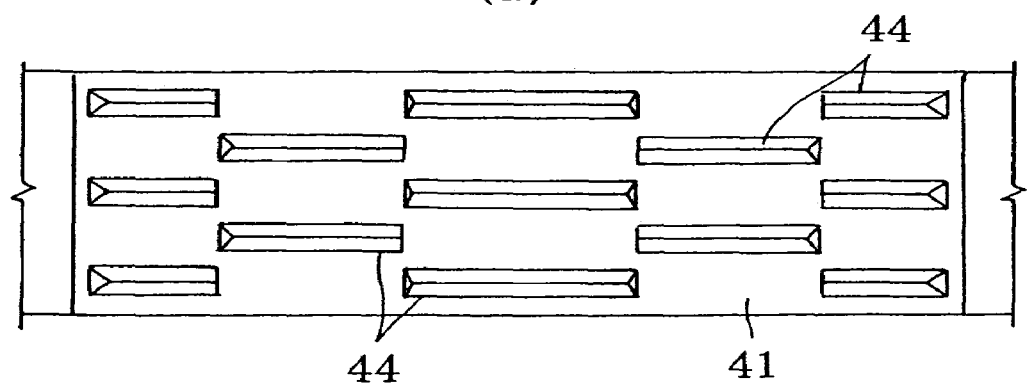
FIG. 23 is a view illustrating arrangements of edge portions according to another embodiment.
Figure 23:
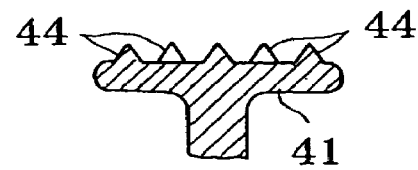
Figure 24:
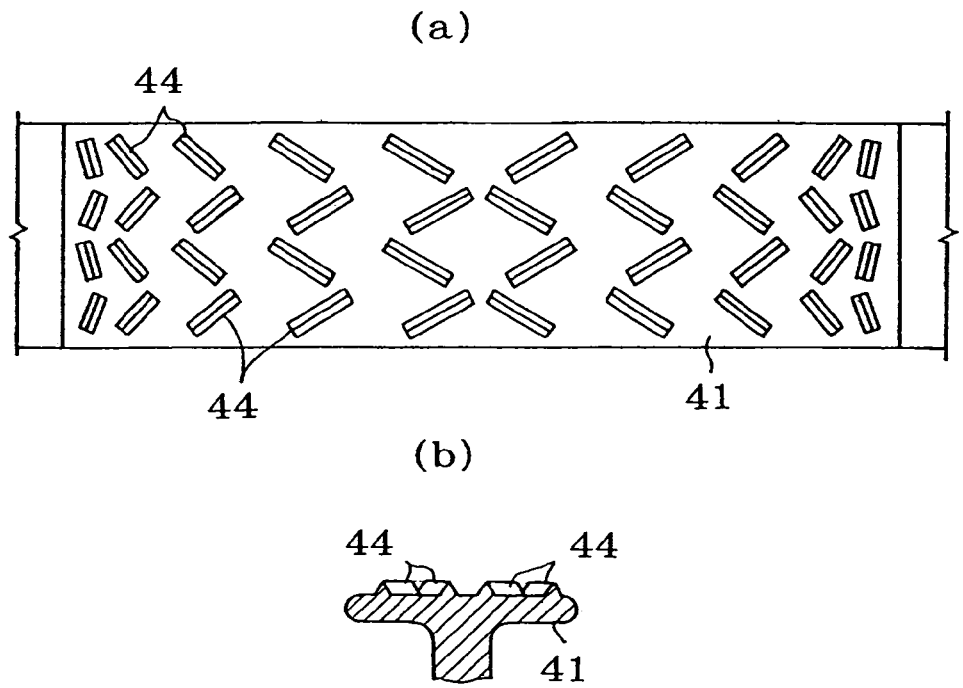
FIG. 24 is a view illustrating arrangements of edge portions according to still another embodiment.

The plurality of edge portions 44 of a posture that is in line with the peripheral direction of the first receiving portion 41 or the second receiving portion 42 may alternatively be disposed in a staggered arrangement as illustrated in FIGS. 23(a) and (b).

As illustrated in FIGS. 22(a) and (b), the plurality of edge portions 44 of a posture that is inclined with respect to the axial core direction of the first receiving portion 41 or the second receiving portion 42 may alternatively be disposed at specified intervals in the peripheral and axial core direction of the first receiving portion or the second receiving portion.

Though not illustrated in the drawings, edge portions 44 of a posture that are in line with the peripheral direction of the first receiving portion 41 or the second receiving portion 42 and edge portions 44 of a posture that are inclined with respect to the axial core direction of the first receiving portion 41 or the second receiving portion 42 may be mixed in setting a pattern for disposing the plurality of edge portions 44.

Eighth Embodiment

The "supporting device for non-averaged force in a pipeline" of the present embodiment differs from the supporting device of the seventh embodiment in the arrangement of the fixing mechanism 23 while the remaining arrangements are substantially identical to those of the supporting device of the seventh embodiment. The structure of the fixing mechanism 23 of the eighth embodiment will now be explained.

<Structure of the Fixing Mechanism>

Figure 25:
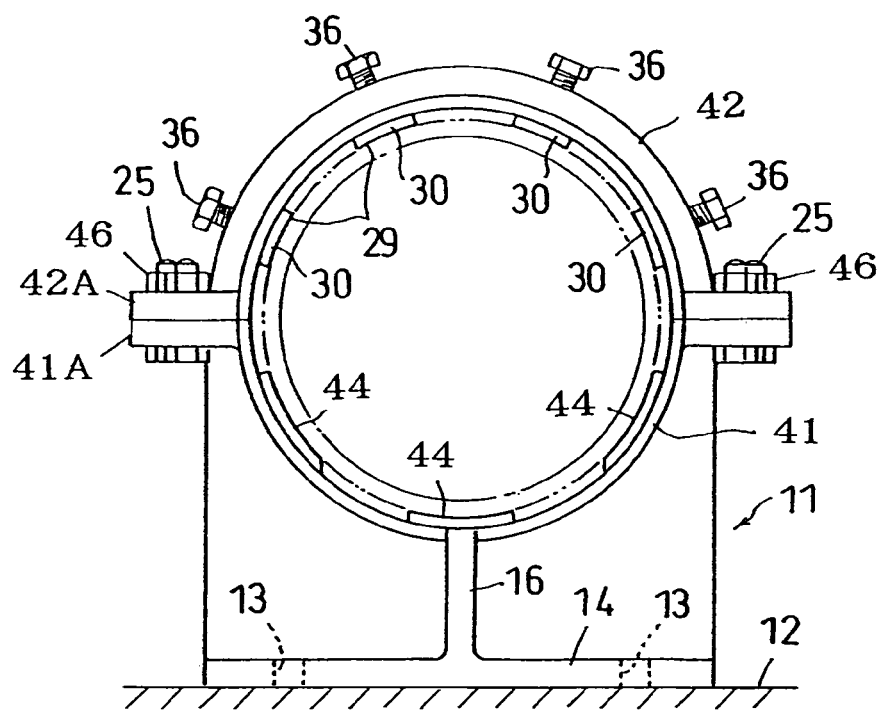
FIG. 25 is a side view of the supporting device for non-averaged force in a pipeline according to an eighth embodiment.
Figure 26:
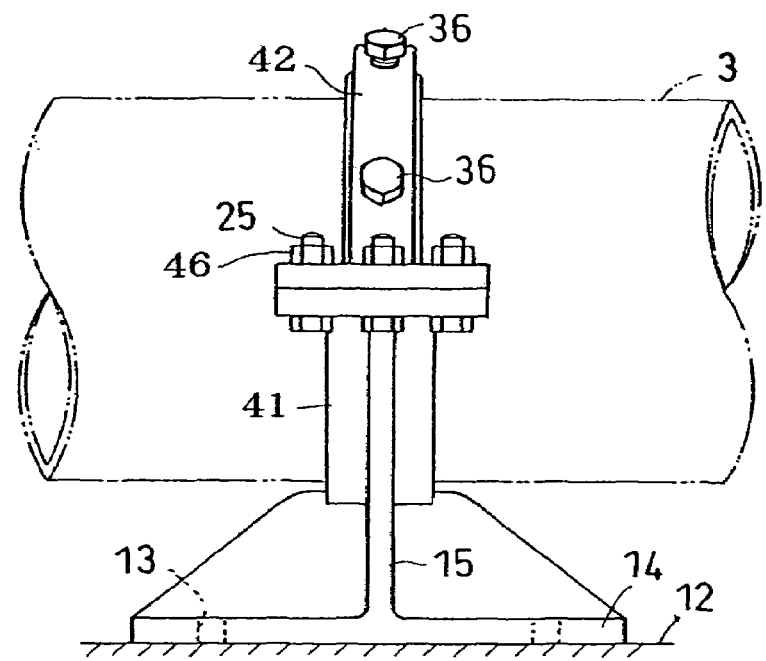
FIG. 26 is a front view of the supporting device of FIG. 25.
Figure 27:
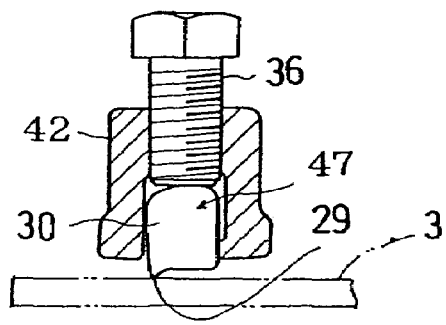
FIG. 27 is a sectional view of a main portion of the supporting device of FIG. 25.

As illustrated in FIGS. 25 to 27, an arc-like first receiving portion 41 provided with a plurality of edge portions 44 for receiving the outer surface of the pipe body 3 from one side (downward side) in the radial direction of the pipe body 3 upon pinching the pipe body 3 is formed integrally with the frame 11 whereas the arc-like second receiving portion 42 for receiving the outer surface of the pipe body 3 from the other side (upward side) of the radial direction of the pipe body 3 is provided to be freely coupled to and released from the coupling with the first receiving portion 41 (the coupling structure of the second receiving portion 42 and the first receiving portion 41 is identical to that of the seventh embodiment).

A plurality of pressing screws 36 that is screwed into a plurality of female screw portions formed in the second receiving portion 42 to be dispersed in the peripheral direction is provided in addition to movement blocking bodies 47 capable of blocking movements of the pipe body 3 in the pipe axial direction with respect to the frame 11 upon being pressed against the outer surface of the pipe body 3 through the pressing force of the pressing screws 36. Each movement blocking body 47 is arranged in that one edge portion 29 that is pressed against the outer surface of the pipe body 3 is provided on one end side of a blocking main body portion 30 in the pipe axial direction.

According to this arrangement, the pipe body 3 and the frame 11 may be integrated through the movement blocking bodies 47 that are pressed against the outer surface of the pipe body 3.

Figure 28:
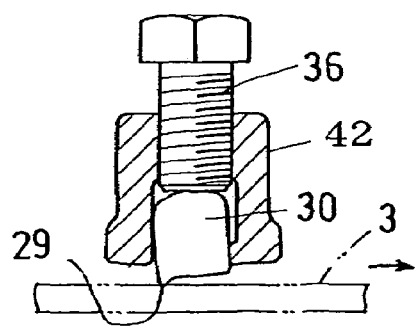
FIG. 28 is a sectional view for explaining the supporting device of FIG. 27.
Figure 29:
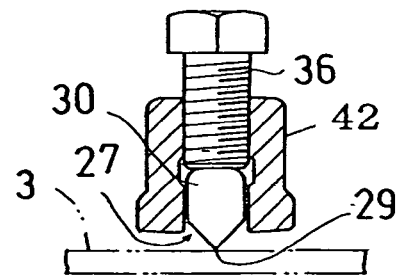
FIG. 29 is a view illustrating a modified example of a movement blocking body.
Figure 30:
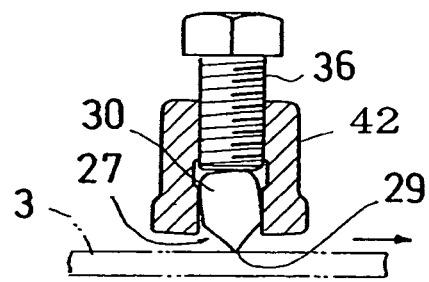
FIG. 30 is a view for explaining the movement blocking body of FIG. 29.

Since each movement blocking body 47 is arranged in that one edge portion 29 that is pressed against the outer surface of the pipe body 3 is provided on one end side of a blocking main body portion 30 in the pipe axial direction, the edge portions 29 will act in a cutting-in manner into the pipe body 3 even when the pipe body 3 tries to move in the pipe axial direction (reference should be made to FIG. 28) so as to block movements of the pipe body 3 and to receive the non-averaged force. It is accordingly possible to obtain a firm protection work.

Modified Example of the Eighth Embodiment

☐ Each movement blocking body 47 may alternatively be arranged in that its edge portion 29 that is pressed against the outer surface of the pipe body 3 is provided in a central portion of the blocking main body portion 30 in the pipe axial direction.

Figure 31:
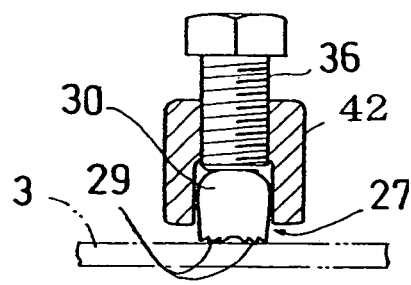
FIG. 31 is a view for explaining another modified example of the movement blocking body.
Figure 32:
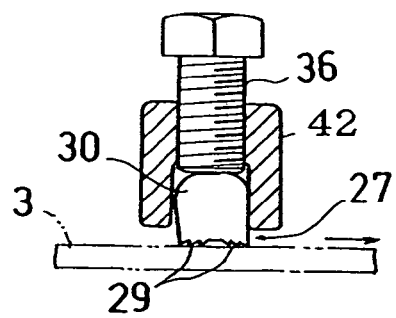
FIG. 32 is a view for explaining the movement blocking body of FIG. 31.
Figure 33:
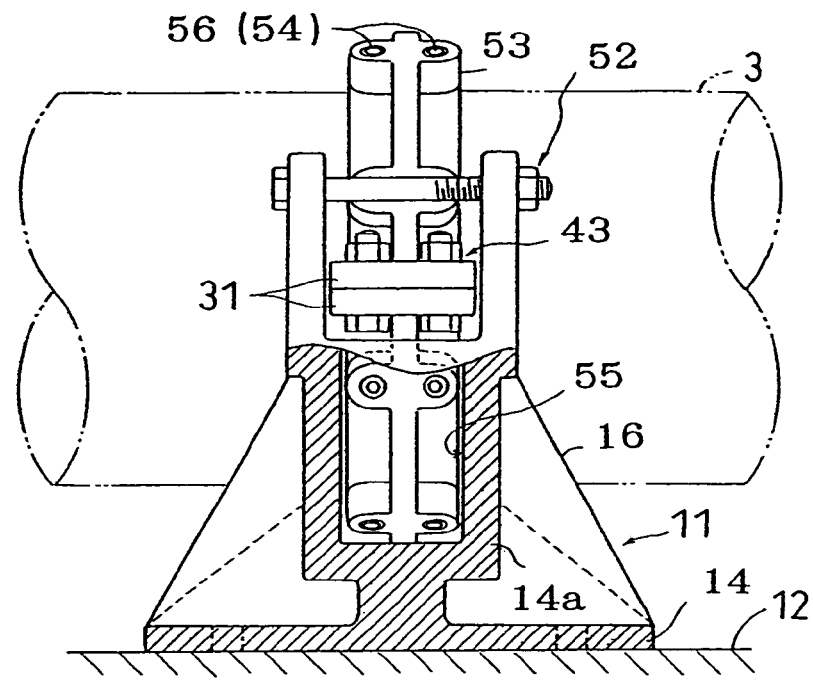
FIG. 33 is a partially notched front view of the supporting device for non-averaged force in a pipeline according to a ninth embodiment.
Figure 34:
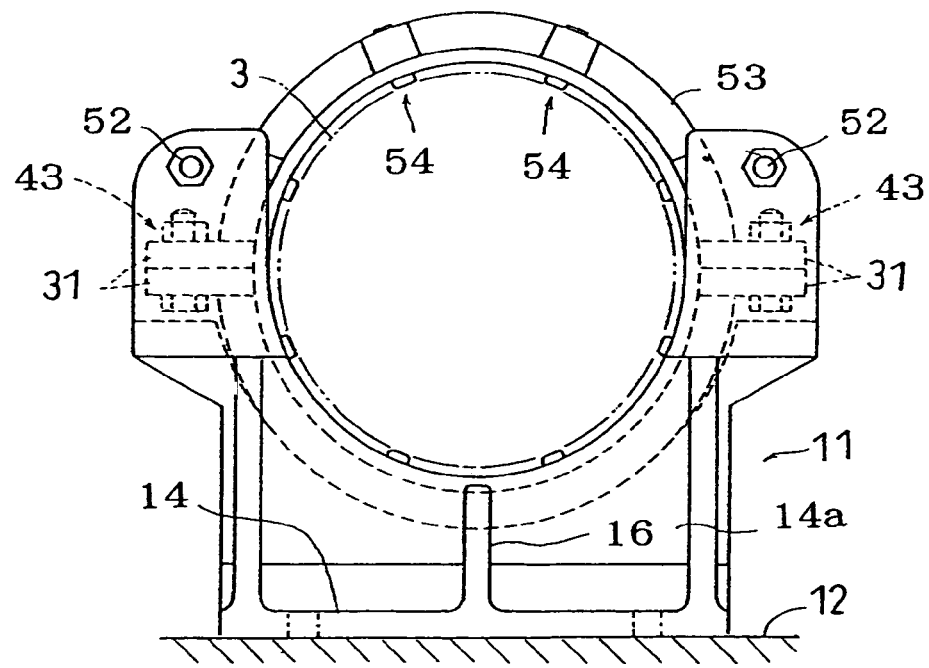
FIG. 34 is a side view of the supporting device of FIG. 33.
Figure 35:
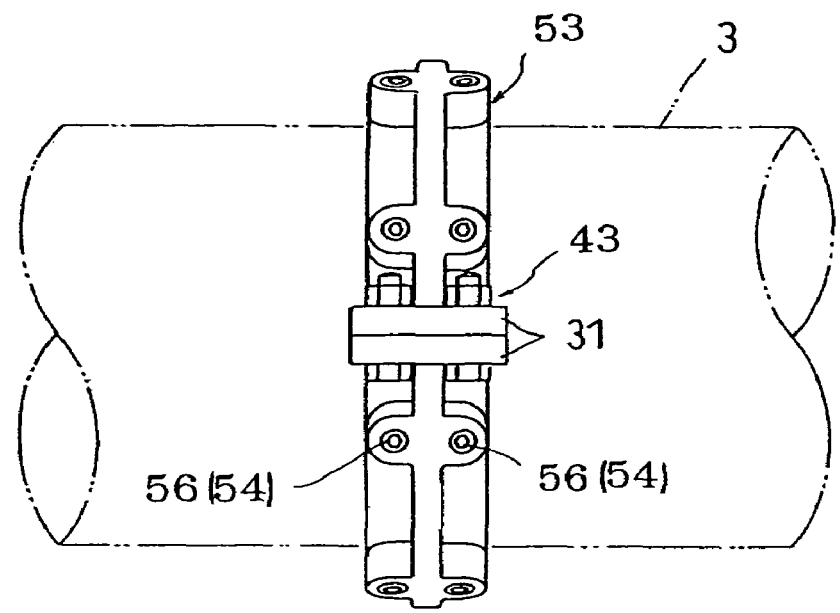
FIG. 35 is a front view illustrating a ring body of the supporting device of FIG. 33.
Figure 36:
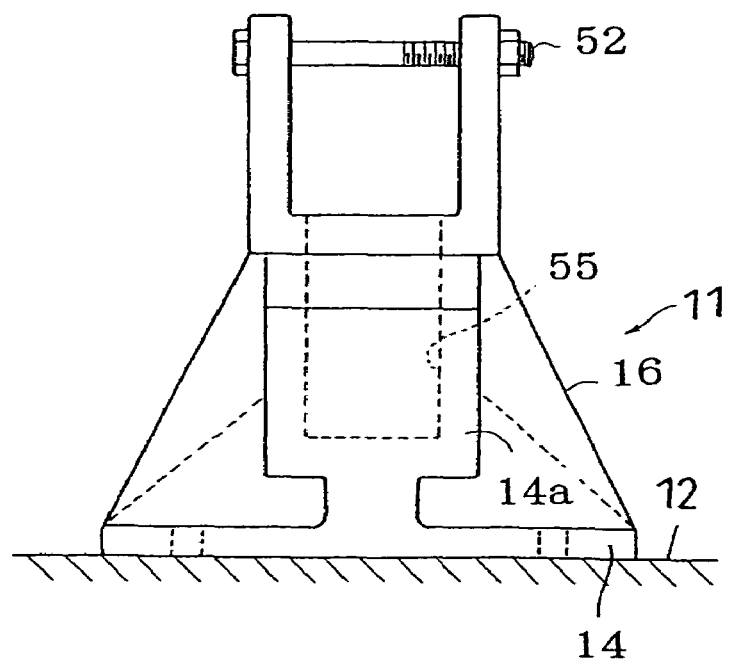
FIG. 36 is a front view illustrating a frame of the supporting device of FIG. 33.
Figure 37:
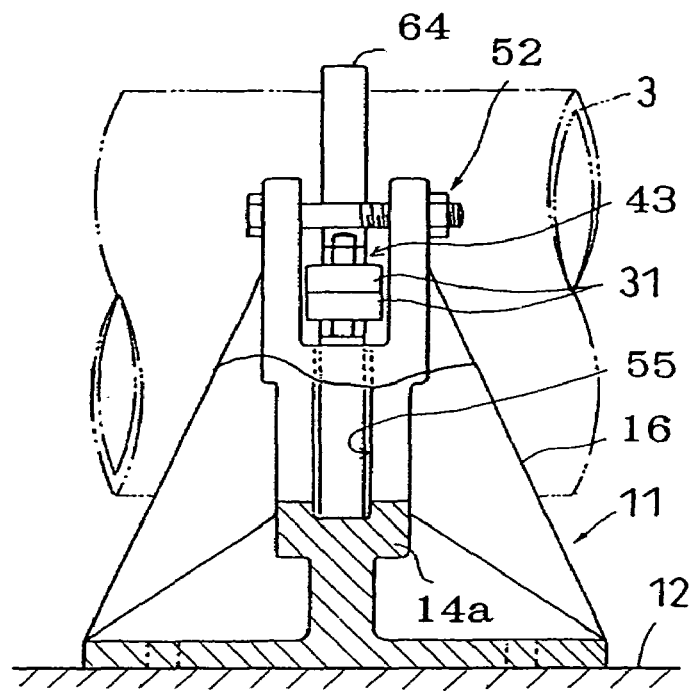
FIG. 37 is a partially notched front view of the supporting device for non-averaged force in a pipeline according to a tenth embodiment.
Figure 38:
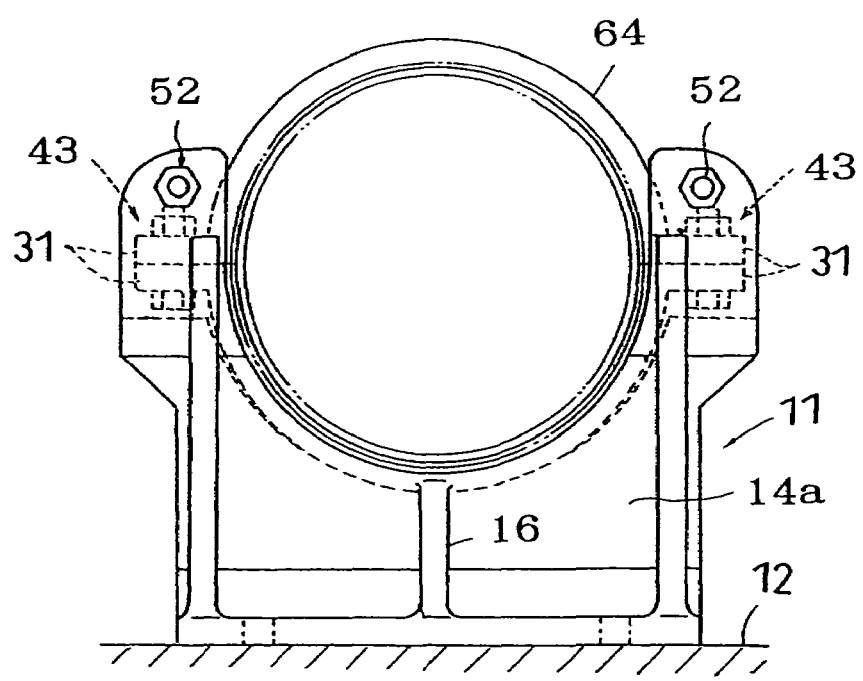
FIG. 38 is a side view of the supporting device of FIG. 37.
Figure 39:
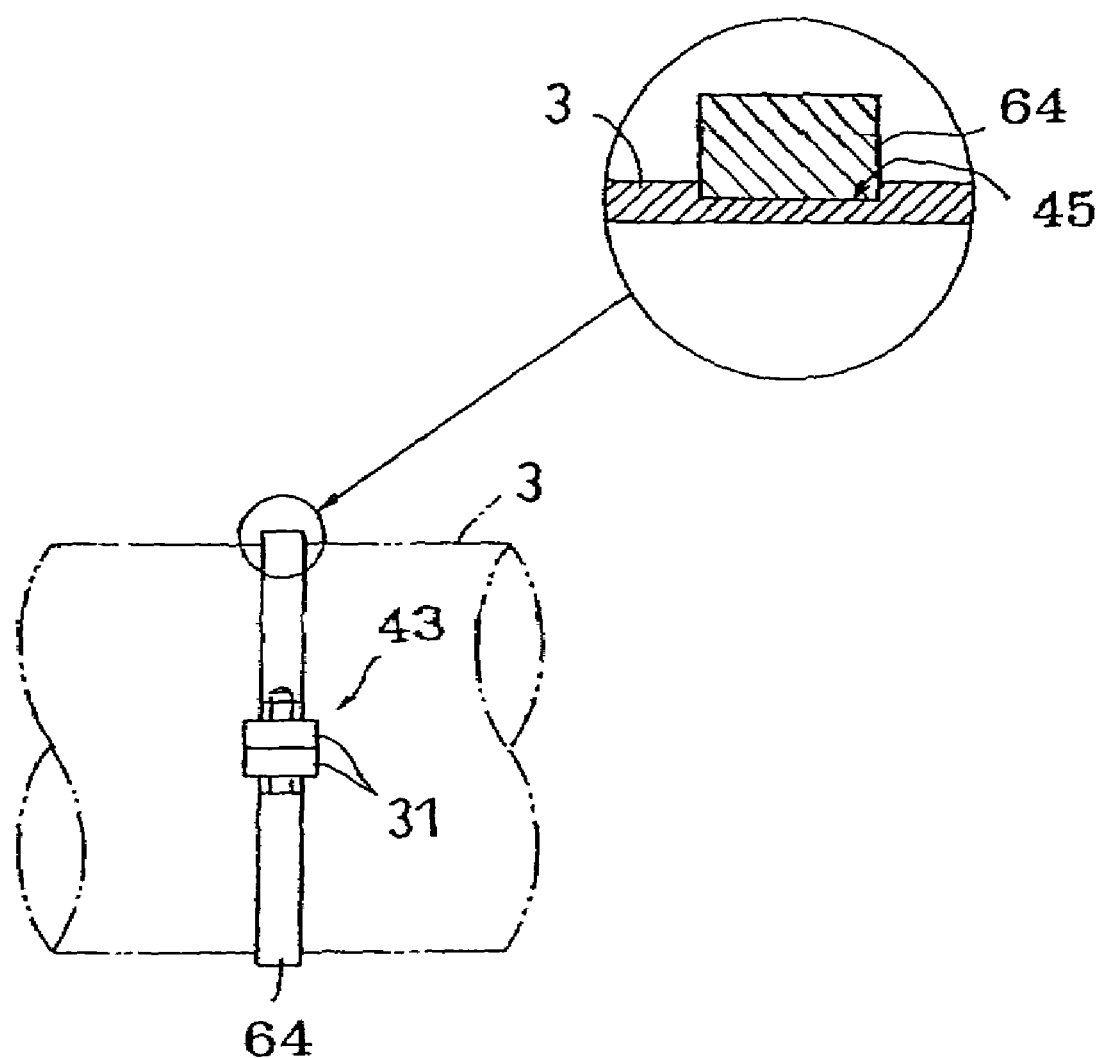
FIG. 39 is a view illustrating a belt body of the supporting device of FIG. 37.
Figure 40:
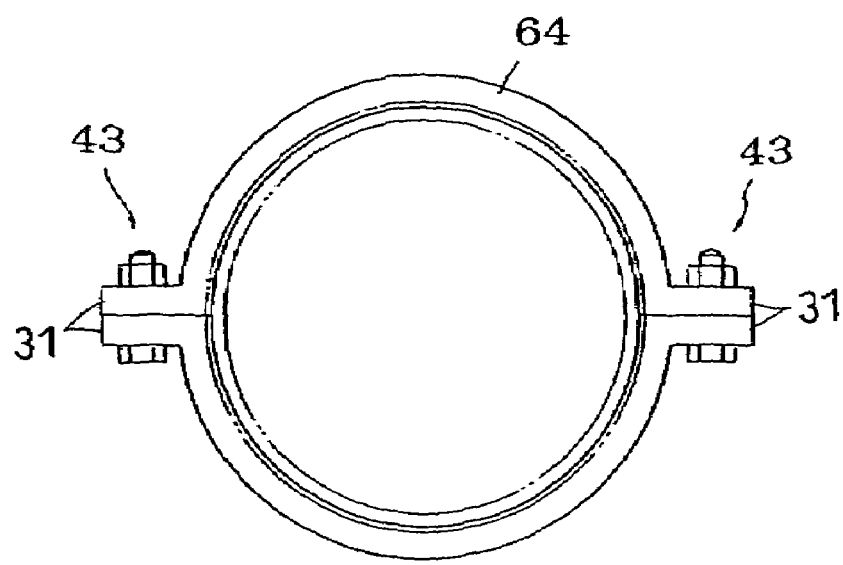
FIG. 40 is a view illustrating a belt body of the supporting device of FIG. 37.

☐ As illustrated in FIGS. 31 and 32, each movement blocking body 47 may alternatively be arranged in that three or more edge portions 29 that are pressed against the outer surface of the pipe body 3 are provided on the blocking main body portion 30 in a condition in which they are located at specified intervals in the pipe axial direction.

☐ The first receiving portion 41 side may be formed with a plurality of pressing screws 36 in addition to movement blocking bodies 47 capable of blocking movements of the pipe body 3 in the pipe axial direction with respect to the frame 11 upon being pressed against the outer surface of the pipe body 3 through the pressing force of the pressing screws 36 whereas the second receiving portion 42 side is provided with edge portions 44.

☐ A plurality of pressing screws 36 may be provided on the first receiving portion 41 side and the second receiving portion 42 side in addition to movement blocking bodies 47 capable of blocking movements of the pipe body 3 in the pipe axial direction with respect to the frame 11 upon being pressed against the outer surface of the pipe body 3 through the pressing force of the pressing screws 36. In this case, the first receiving portion 41 and the second receiving portion 42 may alternatively be integrally formed.

Ninth Embodiment

Still another embodiment will now be explained.

The supporting device for non-averaged force in a pipeline according to this embodiment is arranged, as illustrated in FIGS. 33 to 36, in that a plurality of pressing portions 54 for pressing the pipe body 3 from outside in the radial direction are formed on a ring body 53 of two-split structure enclosing the pipe body 3 to be dispersed in the peripheral direction of the ring body 53. The frame 11 made of cast iron that is fixed to the base concrete 12 of the utility tunnel (which corresponds to the fixing portion) through bolts is provided with a supporting portion for supporting the ring body 53. Flange portions 31 are provided on both arc-like separated ring bodies wherein the flange portions 31 are coupled through bolt mechanisms 43.

Each pressing portion 54 is arranged in that a plurality of female screw portions are formed on the ring body 53 in rows of two and in a radial manner while being dispersed in the peripheral direction of the ring body 53, and pressing bolts 56 are provided for pressing the pipe body 3 at their tip end portions in a condition in which they are screwed into the male screw portions.

The frame 11 is comprised by integrally forming a plate-like mounting seat portion 14, a pipe supporting portion 15 rising up from the mounting seat portion 14, and a rib 16 that is in line with the pipe axial direction.

A supporting portion for supporting the ring body 53 is comprised as a semi-arc-like concave portion 15 for receiving and accumulating the lower separated ring body from among the pair of separated ring bodies (corresponding to the ring body portion) formed on a rising portion 14a.

With this arrangement, the ring body 53 may be integrated with the pipe body 3 by pressing the pipe body 3 through the plurality of pressing bolts 56 of the ring body 53 from outside in the radial direction thereof while the ring body 53 is accumulated and supported by the concave portion 15 formed in the frame 11 that is fixed to the base concrete 12.

It is accordingly possible to block movements of the pipe body 3 in the pipe axial direction owing to non-averaged force and to obtain a firm protection work.

While the mounting seat portion 14 of the frame 11 is mounted to a horizontal mounting surface of the base concrete 12 in this embodiment, the mounting seat portion 14 may be mounted to a vertical mounting surface in some cases. In such a case, it is preferable that a ring body receiving bolt 52 for preventing drop is provided at the rising portion 14a of the frame 11 so as to prevent the ring body 53 from dropping from the frame 11.

Tenth Embodiment

Figure 41:
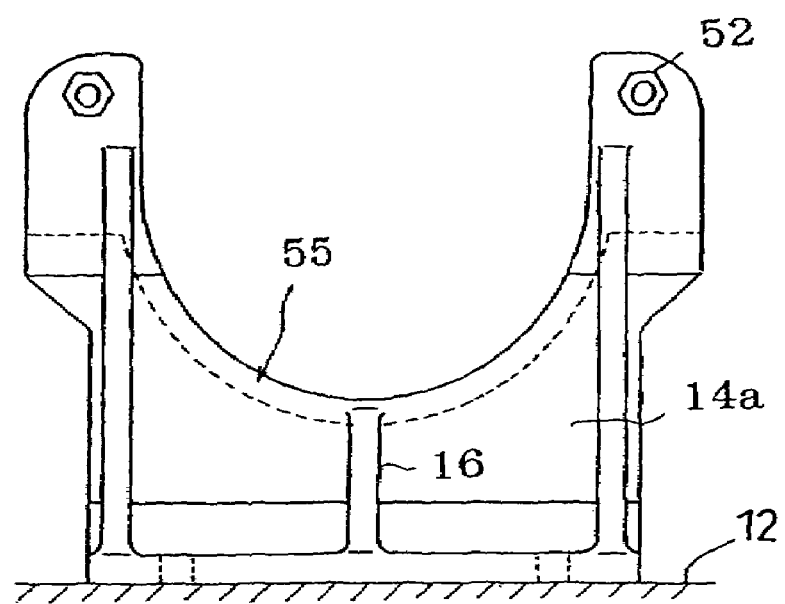
FIG. 41 is a side view illustrating a frame of the supporting device of FIG. 37.
Figure 42:
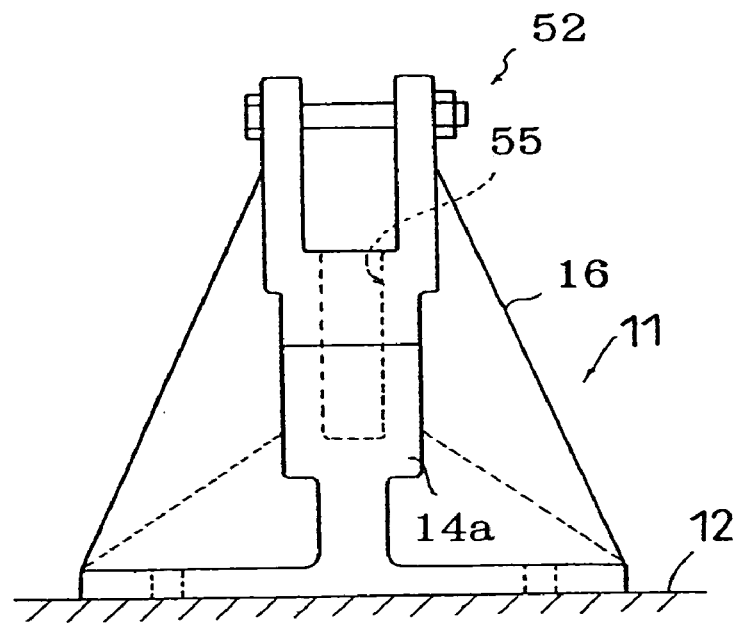
FIG. 42 is a front view illustrating a frame of the supporting device of FIG. 37.

The supporting device for non-averaged force in a pipeline according to this embodiment differs from the supporting device of the above ninth embodiment in the point that a belt body 64 of two-split structure for tightening the pipe body 3 is provided instead of the ring body 53 as illustrated in FIGS. 37 to 40. The structure of the frame 11 is substantially identical as illustrated in FIGS. 41 and 42.

A semi-arc-like concave portion 55 for receiving and accumulating the lower separated belt body (corresponding to the belt body portion) from among the pair of separated belt bodies is provided at the rising portion 14a of the frame 11. Bolt mechanisms 43 are provided at flange portions 31 provided at both separated belt bodies 64 and the pipe body 3 is tightened by both separated belt bodies 64 through the bolt mechanisms 43.

The pipe body 3 is formed with a belt winding groove 45 (reference should be made to FIG. 39) such that movements of the pipe body 3 in the pipe axial direction may be easily prevented through the belt body 64.

Eleventh Embodiment

Figure 43:
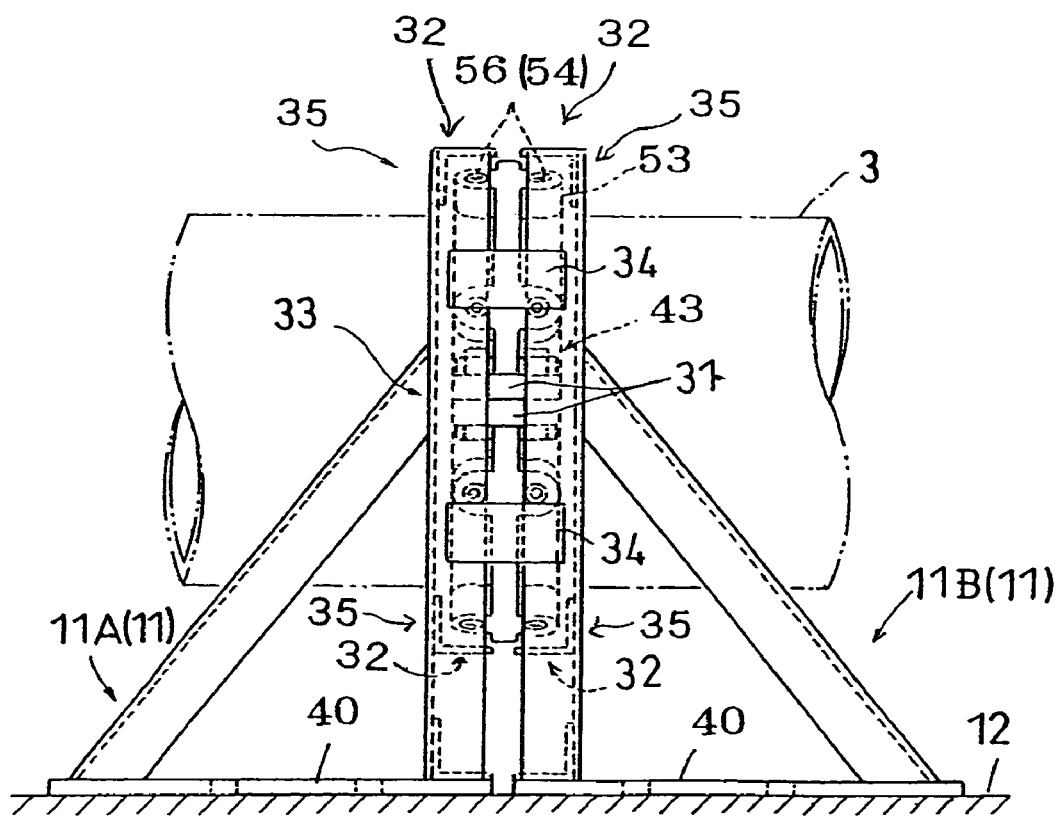
FIG. 43 is a partially notched front view of the supporting device for non-averaged force in a pipeline according to an eleventh embodiment.
Figure 44:
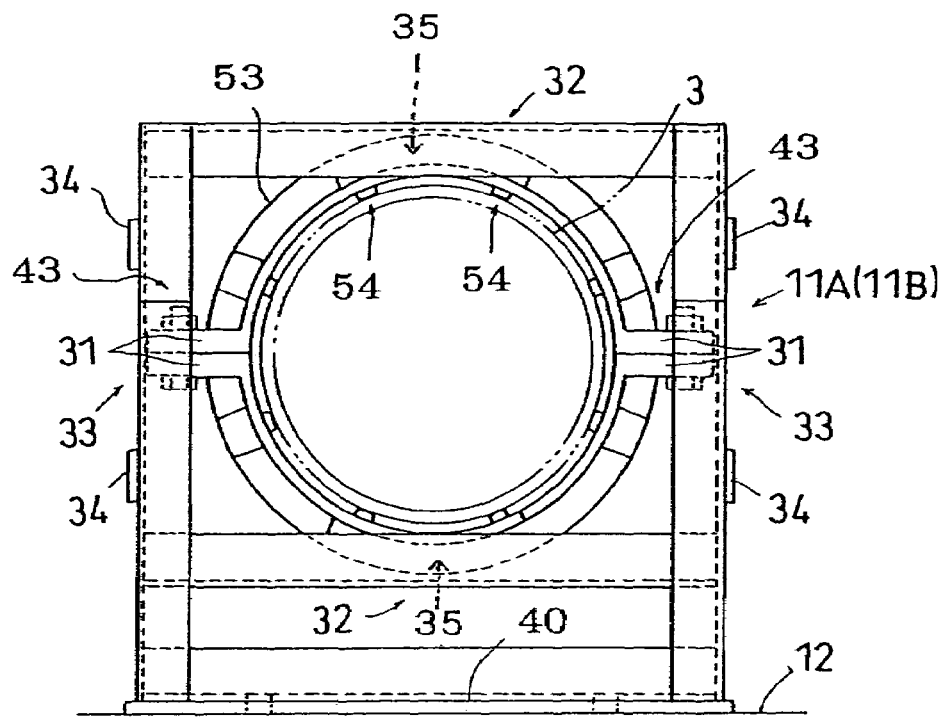
FIG. 44 is a side view of the supporting device of FIG. 43.
Figure 45:
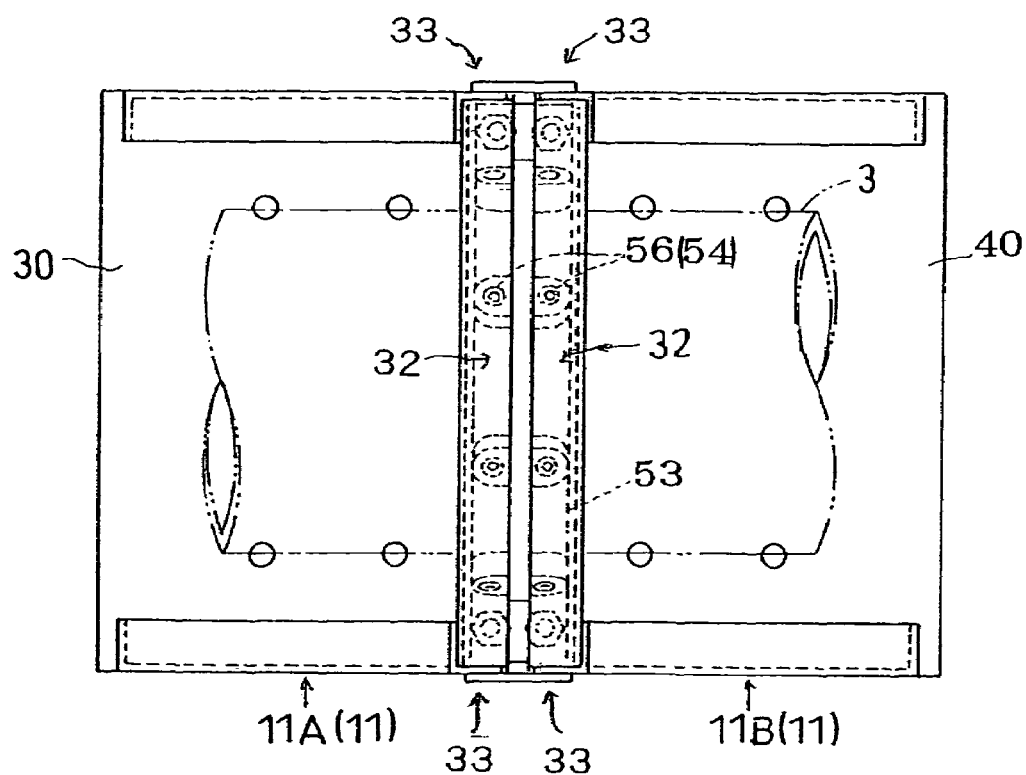
FIG. 45 is a front view of the supporting device for non-averaged force in a pipeline according to a twelfth embodiment.

The supporting device for non-averaged force in a pipeline according to this embodiment differs from the supporting device of the above ninth embodiment in the arrangement of Frame 11 as illustrated in FIGS. 43 to 45. The structure of the ring body 53 is substantially identical (explanations related to the structure of the ring body 53 will be omitted).

The frame 11 is comprised by coupling a pair of separated frames 11A, 11B that are disposed in a condition in which they are aligned in the pipe axial direction of the pipe body 3 through a steel plate 34 for coupling.

The separated frames 11A, 11B are arranged in that a plurality of angle members are welded and fastened in a frame-like manner to a bottom plate 40 with respect to the base concrete 12 of the utility tunnel whereupon a first restricting portion 32 for receiving and restricting the ring body 53 in vertical directions, a second restricting portion 33 for receiving and restricting right and left flange portions 31 provided on the ring body 53 from outside in lateral directions (outside from the right and left), and a third restricting portion 35 for receiving and restricting the ring body 53 in the axial core direction of the pipe body are provided at the respective separated frames 11A, 11B.

Upon restring the ring body 53 through the first, second and third restricting portions 32, 33, 35 of both separated frames 11A, 11B, both separated frames 11A, 11B are coupled by the steel plate 34 for coupling. The steel plate 34 for coupling is welded and fastened to both separated frames 11A, 11B.

Modified Examples of the Ninth and Tenth Embodiment

Though not illustrated in the drawings, the present invention is also applicable to a supporting device for non-averaged force in pipelines of the following types.

☐ A supporting device for non-averaged force in which wedge bodies, which are capable of preventing movements of the pipe body 3 in the pipe axial direction with respect to the frame 11 when being pressed against the outer surface of the pipe body 3 through pressing force acting on the pipe body 3 are provided on the ring body 53. In this arrangement, the wedge bodies correspond to the pressing portions.

☐ A supporting device for non-averaged force in which a first receiving portion provided with edge portions for receiving the outer surface of the pipe body 3 from one side in the radial direction of the pipe body 3 upon pinching the pipe body 3 is provided at the frame 11 whereas a second receiving portion provided with edge portions (or pressing portions 54 of the ninth embodiment or the wedge bodies of above ☐) for receiving the outer surface of the pipe body 3 from the other side in the radial direction of the pipe body 3 is provided as a separate body than the frame 11 and to be coupled to and released from the coupling with the first receiving portion.

In this arrangement, the edge portions correspond to the pressing portions while the first receiving portion and the second receiving portion in the coupled condition correspond to the ring body.

Other Embodiments (a) The pipe bodies 3 are not limited to metallic pipes but may also be resin pipes.

(b) The pipe bodies 3 may be a pipe body through which either one of gas, liquid or a mixture of gas and liquid communicate.

(c) While the pipe bodies 3 have been supported by the base concrete 12 through the supporting device according to the present invention, the present invention is also applicable in case the pipe bodies 3 are to be supported on side walls or to be supported on ceiling walls through the supporting device.

(d) The mounting seat portion 14 may be of warped shaped (in such a case, the mounting seat portion 14 may be outwardly fitted to a round pipe or similar).

(e) The number of wedge bodies 20 or that of the male screw members is not limited to the number according to the above embodiments.

(f) While only a single row of edge portions 24 is provided in the pipe axial direction in the above embodiments, a plurality of (e.g. two) rows of edge portions may be provided in the pipe axial direction at specified intervals.

What is claimed is:

1. A supporting device for non-averaged force in a pipeline comprising:
    a frame comprising:
    i) a pipe supporting portion for encircling a pipe body inserted thereto in an axial direction of the pipe supporting portion, said pipe supporting portion having an inner circumferential surface being divided into first and second portions in its circumferential direction,
    ii) a mounting seat portion configured to be fixed to a supporting planar base, said mounting seat portion having a width perpendicular to the axial direction of the pipe supporting portion, which is greater than an inner diameter of the pipe supporting portion, said mounting seat portion having a length in the axial direction of the pipe supporting portion, which is greater than a thickness of the pipe supporting portion in its axial direction, said pipe supporting portion extending vertically from the mounting seat portion, and
    iii) a rib attached to the mounting seat portion, extending vertically from the mounting seat portion and extending in the axial direction of the pipe supporting portion, and connected to the pipe supporting portion for supporting the pipe supporting portion, wherein the mounting seat portion, the pipe supporting portion, and the rib are rigidly formed; and
    a fixing mechanism for fixing the pipe body to the pipe supporting portion, said fixing mechanism comprising a coupling member for coupling the first and second portions of the pipe supporting portion to encircle the pipe body, and at least sharp edges or wedges disposed in the inner surface of the pipe supporting portion and movable inwardly with respect to the inner surface of the pipe supporting portion to contact and unmovably fix the pipe body to the pipe supporting portion, wherein an interior between the inner surface of the pipe supporting portion with the edges or wedges and an outer surface of the pipe body is sealable for anti-corrosive effects by closing circumferential clearances at front and rear ends of the interior with a caulking material.

2. The supporting device according to claim 1, wherein the pipe supporting portion has an inner circumferential surface being divided into first and second portions in its circumferential direction, wherein the fixing mechanism comprises:
    (i) edge portions formed exclusively on the first portion of the inner circumferential surface of the pipe supporting portion, for receiving an outer surface of the pipe body, and
    (ii) wedge bodies formed exclusively on the second portion of the inner circumferential surface of the pipe supporting portion, for blocking movements of the pipe body in an axial direction of the pipe supporting portion when an outer surface of the pipe body is pressed against the wedge bodies and the edge portions,
    wherein the wedge bodies are composed of multiple pairs disposed in the circumferential direction of the pipe supporting portion, each pair of wedge bodies being disposed in a condition such that directions of wedge actions of the wedge bodies of the pair are opposite to each other with respect to the axial direction of the pipe supporting portion.

3. The supporting device according to claim 1, wherein the pipe supporting portion has a circumferential inner surface being divided into first half and second half portions in its circumferential direction, wherein the fixing mechanism comprises:
    (i) edge portions for receiving an outer surface of the pipe body, said edge portions formed exclusively on the first half portion of the inner circumferential surface of the pipe supporting portion, and
    (ii) male screw members for blocking movements of the pipe body in an axial direction of the pipe supporting portion, said male screw members provided exclusively on the second half portion of the inner circumferential surface of the pipe supporting portion,
    wherein the first portion of the inner circumferential surface and the second portion of the inner circumferential surface face to each other, and said male screw members configured to press against an outer surface of the pipe body at their tip end portions when the male screw members are screwed into female screw portions formed in the pipe supporting portion.

4. The supporting device according to claim 3, wherein the tip end portions of the male screw members are indented.

5. The supporting device according to claim 1, wherein the pipe supporting portion has a circumferential inner surface, wherein the fixing mechanism comprises:
    male screw members for blocking movements of the pipe body in an axial direction of the pipe supporting portion, said male screw members composed of multiple pairs disposed on the inner circumferential surface of the pipe supporting portion in its circumferential direction, wherein said male screw members are configured to press against an outer surface of the pipe body at their tip end portions when the male screw members are screwed into female screw portions formed in the pipe supporting portion.

6. The supporting device according to claim 5, wherein the tip end portions of the male screw members are indented.

7. The supporting device according to claim 1, wherein the pipe supporting portion has an inner circumferential surface, wherein the fixing mechanism comprises:

wedge bodies formed on the inner circumferential surface of the pipe supporting portion, for blocking movements of the pipe body in an axial direction of the pipe supporting portion when an outer surface of the pipe body is pressed against the wedge bodies, wherein the wedge bodies are composed of multiple pairs disposed in the circumferential direction of the pipe supporting portion, each pair of wedge bodies being disposed in a condition such that directions of wedge actions of the wedge bodies of the pair are opposite to each other with respect to the axial direction of the pipe supporting portion.

8. The supporting device according to claim 1, wherein the two separable pieces of the pipe supporting portion are upper and lower pieces, wherein the top piece constitutes an upper half circumference of the pip supporting portion, and the bottom piece constitutes a lower half circumference of the pipe supporting portion.

9. The supporting device according to claim 1, wherein the pipe supporting portion has an inner circumferential surface, wherein the fixing mechanism comprises:

(i) movement blocking bodies for blocking movements of the pipe body in an axial direction of the pipe supporting portion, each movement blocking body having three or more edge portions disposed at intervals in the axial direction, and (ii) pressing screw members for pressing a top surface of each movement blocking body through the frame, whereby only the edge portion(s) are to be in contact with and pressed against an outer surface of the pipe body.

10. The supporting device according to claim 1, wherein the rib further comprises a vertical portion perpendicular to the axial direction of the pipe supporting portion, said vertical portion extending from the mounting seat portion and connected to the pipe supporting portion.

11. The supporting device according to claim 10, wherein the vertical portion has a width in a direction perpendicular to the axial direction of the pipe supporting portion, which width is the same as that of the mounting seat portion.

* * * * *